US010546090B2

(12) United States Patent
Nifong et al.

(10) Patent No.: US 10,546,090 B2
(45) Date of Patent: Jan. 28, 2020

(54) VIRTUAL CELL MODEL USAGE

(71) Applicant: Synopsys, Inc., Mountain View, CA (US)

(72) Inventors: Gary B Nifong, Durham, NC (US); Jun Chen, Cary, NC (US); Karthikeyan Muthalagu, Morrisville, NC (US); James Lewis Nance, Raleigh, NC (US); Zhen Ren, Morrisville, NC (US); Ying Shi, Chapel Hill, NC (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/713,716

(22) Filed: May 15, 2015

(65) Prior Publication Data

US 2015/0339433 A1 Nov. 26, 2015

Related U.S. Application Data

(60) Provisional application No. 62/006,657, filed on Jun. 2, 2014, provisional application No. 62/006,607, filed on Jun. 2, 2014, provisional application No. 62/006,069, filed on May 31, 2014, provisional application No. 62/006,092, filed on May 31, 2014, provisional application No. 62/006,083, filed on May 31, 2014, provisional application No. 62/002,808, filed on May 24, 2014.

(51) Int. Cl.
G06F 17/50 (2006.01)

(52) U.S. Cl.
CPC .......... *G06F 17/5072* (2013.01); *G06F 17/50* (2013.01); *G06F 17/5009* (2013.01); *G06F 17/5081* (2013.01); *G06F 17/5068* (2013.01); *G06F 2217/12* (2013.01)

(58) Field of Classification Search
CPC ............. G06F 17/5081; G06F 17/5072; G06F 2217/12; H01L 23/528
USPC ............ 716/50–55, 118–119, 139; 430/5, 30
See application file for complete search history.

(56) References Cited

U.S. PATENT DOCUMENTS 5,281,558 A 1/1994 Bamji et al.
5,309,371 A 5/1994 Shikata et al.
(Continued)

OTHER PUBLICATIONS

U.S. Appl. No. 14/634,695, Final Office Action dated Apr. 12, 2018.
(Continued)

*Primary Examiner* — Nghia M Doan
(74) *Attorney, Agent, or Firm* — Alston & Bird LLP

(57) ABSTRACT

Hierarchical design levels describe semiconductor designs and define architecture, behavior, structure, function, etc. for the designs. A virtual cell model based on cells populating a design is constructed and used for purposes including design simulation, analysis, verification, validation, and so on. A cell and multiple instances of the cell are identified across a design. An empty cell model comparable to the identified cell is created. A compressed representation of unsolved geometric data based on the identified cell data and a virtual hierarchical layer (VHL) are generated as model data, and the model data is placed into the empty cell model. As a result of the placement of the model data, a virtual cell model is created.

26 Claims, 17 Drawing Sheets

(56) References Cited

U.S. PATENT DOCUMENTS

| | | |
|---|---|---|
| 5,493,510 A | 2/1996 | Shikata |
| 5,528,508 A | 6/1996 | Russell et al. |
| 5,559,718 A | 9/1996 | Baisuck et al. |
| 5,581,475 A | 12/1996 | Majors |
| 6,009,250 A | 12/1999 | Ho et al. |
| 6,009,251 A | 12/1999 | Ho et al. |
| 6,011,911 A | 1/2000 | Ho et al. |
| 6,035,113 A | 3/2000 | Gerber et al. |
| 6,047,116 A | 4/2000 | Murakami et al. |
| 6,223,327 B1 * | 4/2001 | Yamaji ............... G06F 17/5081 716/111 |
| 6,275,971 B1 | 8/2001 | Levy |
| 6,289,412 B1 | 9/2001 | Yuan et al. |
| 6,363,516 B1 | 3/2002 | Cano et al. |
| 6,543,039 B1 | 4/2003 | Watanabe |
| 6,629,304 B1 | 9/2003 | Gasanov et al. |
| 6,730,463 B2 | 5/2004 | Heissmeier et al. |
| 6,845,494 B2 | 1/2005 | Burks et al. |
| 6,886,148 B2 | 4/2005 | Solomon |
| 6,969,837 B2 | 11/2005 | Ye |
| 7,103,863 B2 | 9/2006 | Riepe et al. |
| 7,146,583 B1 * | 12/2006 | Sun ............... G06F 17/5045 716/113 |
| 7,149,989 B2 | 12/2006 | Lakshmanan |
| 7,155,440 B1 | 12/2006 | Kronmiller et al. |
| 7,415,694 B2 | 8/2008 | Mayhew |
| 7,418,693 B1 | 8/2008 | Gennari et al. |
| 7,461,359 B1 | 12/2008 | Nequist |
| 7,847,937 B1 | 12/2010 | Bevis |
| 7,873,204 B2 | 1/2011 | Wihl et al. |
| 7,873,585 B2 | 1/2011 | Izikson |
| 7,984,395 B2 | 7/2011 | Cork |
| 8,019,561 B1 | 9/2011 | Sahrling |
| 8,453,091 B1 * | 5/2013 | Rao ............... G06F 17/5031 716/118 |
| 8,539,416 B1 | 9/2013 | Rossman et al. |
| 8,799,833 B2 | 8/2014 | Wann et al. |
| 9,015,645 B1 * | 4/2015 | Pampati ............... G06F 17/5081 716/130 |
| 9,405,879 B2 | 8/2016 | Wang et al. |
| 9,740,811 B2 | 8/2017 | Chen et al. |
| 9,740,812 B2 | 8/2017 | Nance et al. |
| 9,881,114 B2 * | 1/2018 | Nifong ............... G06F 17/5072 |
| 9,916,411 B2 | 3/2018 | Nifong et al. |
| 10,303,837 B2 | 5/2019 | Nance et al. |
| 10,311,190 B2 | 6/2019 | Chen et al. |
| 2002/0046392 A1 | 4/2002 | Ludwig et al. |
| 2003/0163795 A1 | 8/2003 | Morgan et al. |
| 2003/0229882 A1 | 12/2003 | Ludwig et al. |
| 2005/0076316 A1 | 4/2005 | Pierrat et al. |
| 2005/0183053 A1 | 8/2005 | Ishizuka |
| 2005/0235245 A1 | 10/2005 | Kotani et al. |
| 2006/0136856 A1 * | 6/2006 | Tang ............... G06F 17/5068 716/122 |
| 2008/0046849 A1 * | 2/2008 | Choi ............... G06F 17/5068 716/53 |
| 2008/0127016 A1 | 5/2008 | Ishikawa |
| 2008/0155485 A1 | 6/2008 | Lin et al. |
| 2008/0244493 A1 | 10/2008 | Finkler |
| 2009/0089720 A1 | 4/2009 | Nequist |
| 2009/0210845 A1 | 8/2009 | Malgioglio et al. |
| 2009/0216450 A1 * | 8/2009 | Sakamoto ............... B82Y 10/00 702/1 |
| 2009/0287440 A1 | 11/2009 | Kulkarni |
| 2009/0310870 A1 | 12/2009 | Monkowski |
| 2010/0238433 A1 | 9/2010 | Lange et al. |
| 2010/0251202 A1 | 9/2010 | Pierrat |
| 2011/0084312 A1 | 4/2011 | Quandt et al. |
| 2014/0215422 A1 | 7/2014 | Juneja et al. |
| 2015/0089457 A1 | 3/2015 | Agarwal et al. |
| 2015/0213189 A1 | 7/2015 | Oberai |
| 2015/0339430 A1 | 11/2015 | Nifong et al. |

OTHER PUBLICATIONS

U.S. Appl. No. 15/654,511, Non-Final Office Action dated Apr. 10, 2018.
U.S. Appl. No. 15/654,565, Non-Final Office Action dated Apr. 23, 2018.
U.S. Appl. No. 14/604,694, Non-Final Office Action dated Nov. 19, 2015.
U.S. Appl. No. 14/604,694, Notice of Allowance dated Jun. 2, 2016.
U.S. Appl. No. 14/634,695, Final Office Action dated Dec. 14, 2016.
U.S. Appl. No. 14/634,695, Non-Final Office Action dated Jul. 1, 2016.
U.S. Appl. No. 14/634,695, Non-Final Office Action dated Jul. 14, 2017.
U.S. Appl. No. 14/673,064, Final Office Action dated Sep. 26, 2016.
U.S. Appl. No. 14/673,064, Non-Final Office Action dated Jun. 8, 2016.
U.S. Appl. No. 14/673,064, Notice of Allowance dated Mar. 8, 2017.
U.S. Appl. No. 14/673,064, Notice of Allowance dated Apr. 26, 2017.
U.S. Appl. No. 14/673,064, Notice of Allowance dated Nov. 14, 2016.
U.S. Appl. No. 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Mar. 2, 2017.
U.S. Appl. No. 14/673,709, Notice of Allowance dated Apr. 12, 2017.
U.S. Appl. No. 14/673,709, Notice of Allowance dated Nov. 8, 2016.
U.S. Appl. No. 14/713,488, Non-Final Office Action dated Mar. 2, 2017.
U.S. Appl. No. 14/713,488, Notice of Allowance dated Oct. 30, 2017.
U.S. Appl. No. 14/719,996, Non-Final Office Action dated Aug. 26, 2016.
U.S. Appl. No. 14/719,996, Notice of Allowance dated Mar. 15, 2017.
U.S. Appl. No. 14/719,996, Notice of Allowance dated Jun. 5, 2017.
U.S. Appl. No. 14/719,996, Notice of Allowance dated Sep. 22, 2017.
U.S. Appl. No. 14/719,996, Notice of Allowance dated Nov. 16, 2016.
U.S. Appl. No. 14/634,695, Non-Final Office Action dated Nov. 14, 2018.
U.S. Appl. No. 15/654,511, Notice of Allowance dated Jan. 23, 2019.
U.S. Appl. No. 15/654,565, Notice of Allowance dated Jan. 17, 2019.
U.S. Appl. No. 14/634,695, Notice of Allowance dated Jul. 3, 2019.

* cited by examiner

VIRTUAL CELL MODEL USAGE

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. Each of the foregoing applications are hereby incorporated by reference in their entirety.

FIELD OF ART

This application relates generally to semiconductor circuit design and more particularly to verification of semiconductor designs and virtual cell model usage.

BACKGROUND

Integrated circuits (ICs) can contain billons of transistors and other electronic structures such as resistors, capacitors, diodes, and interconnecting conductors. The design process for complex modern integrated circuits (ICs) involves many different coordinated steps arranged to produce an IC that functions as intended; therefore, managing the complexity inherent in the multi-step process is crucial to creating electronic designs that operate as planned. One of the steps in the design process of an IC is the physical verification process, which is typically highly automated. The physical verification process for an IC is a design step taken by semiconductor manufacturers before commencing the fabrication of an IC.

In order to be able to verify a design, semiconductor foundries first define a set of design rules for manufacturing (DRM) for IC designers to follow in order to ensure successful manufacture and high yield of a design during the fabrication process. The DRM provide a benchmark against which the design can be tested. The DRM are defined as a set of geometric relationships between manufacturing layers, layers which in turn are used to create an IC. A physical design layout can include hundreds of layers used during the fabrication process to create transistors and electrical interconnect in the IC. The semiconductor process has grown in complexity and a physical design layout has to adhere to thousands of design rules before a design can be successfully fabricated. Use of a design rule checking (DRC) physical verification tool is an industry standard process for implementing the semiconductor's DRM.

The DRM can define many different parameters, such as width, spacing, angle, enclosure, density, and electrical connectivity rules for design layers, parameters which in turn are translated into a DRC runset. A DRC runset is defined as set of DRC operations that verify the required DRM rules. A DRC tool provides a set of operations, or commands, from which a designer selects and uses the selected commands to build a sequence of DRC commands to satisfy each DRM rule. The complexity of modern designs means that checking DRM rules commonly requires a DRC runset with 20,000 or more DRC commands for technology nodes smaller than 28 nanometers (nm). Modern DRC physical verification tools have a large suite of geometric and electrical commands to effectively implement the complex DRM rules. Many of these geometric and electrical commands result in the implementation of a unique algorithm that is not shared between individual commands, thus resulting in a very complex DRC tool with many algorithms.

Large ICs are typically built using a hierarchical method that begins with the creation of small child cells which are in turn combined into larger parent cells, which are then successively used to build larger and larger cells to create an IC hierarchical design. The hierarchal nature of the design allows physical verification tools to selectively access portions of the design in an efficient manner, a necessity in processing cutting-edge, extremely large designs. Various forms of flattening processes present an alternative to hierarchical processing, but the flattening processes can result in very large increases in processing time and are often not feasible for design verification.

SUMMARY

Model data, which is a compressed representation of the unsolved geometric data for each cell in the hierarchy of an integrated circuit design, is propagated to a cell's parent cells through model channels. As the design rule checking (DRC) algorithms process through the IC design's hierarchy to process the input data layer cell by cell, a virtual cell model is generated for each cell, and the original data of the cell is released from memory. Then, in the parent cell, the geometric information can be extracted from the virtual cell models to resolve geometric operations that were unresolved in the child cells. A computer-implemented method for design analysis is disclosed comprising: identifying a cell and multiple instances of the cell within a plurality of cells in a semiconductor design that includes the plurality of cells and a plurality of hierarchical design levels; creating an empty cell model corresponding with the cell which was identified; and generating model data, based on data within the cell and virtual hierarchical layer (VHL) shapes, and placing the model data into the empty cell model to create a virtual cell model. The generating the model data can include executing an area command to process each of the other shapes that are overlapping the data within the cell. In some embodiments, the method includes passing the model data to a higher level of hierarchy within the plurality of hierarchical design levels. In embodiments, the method includes using the virtual cell model in place of the cell in design operations.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
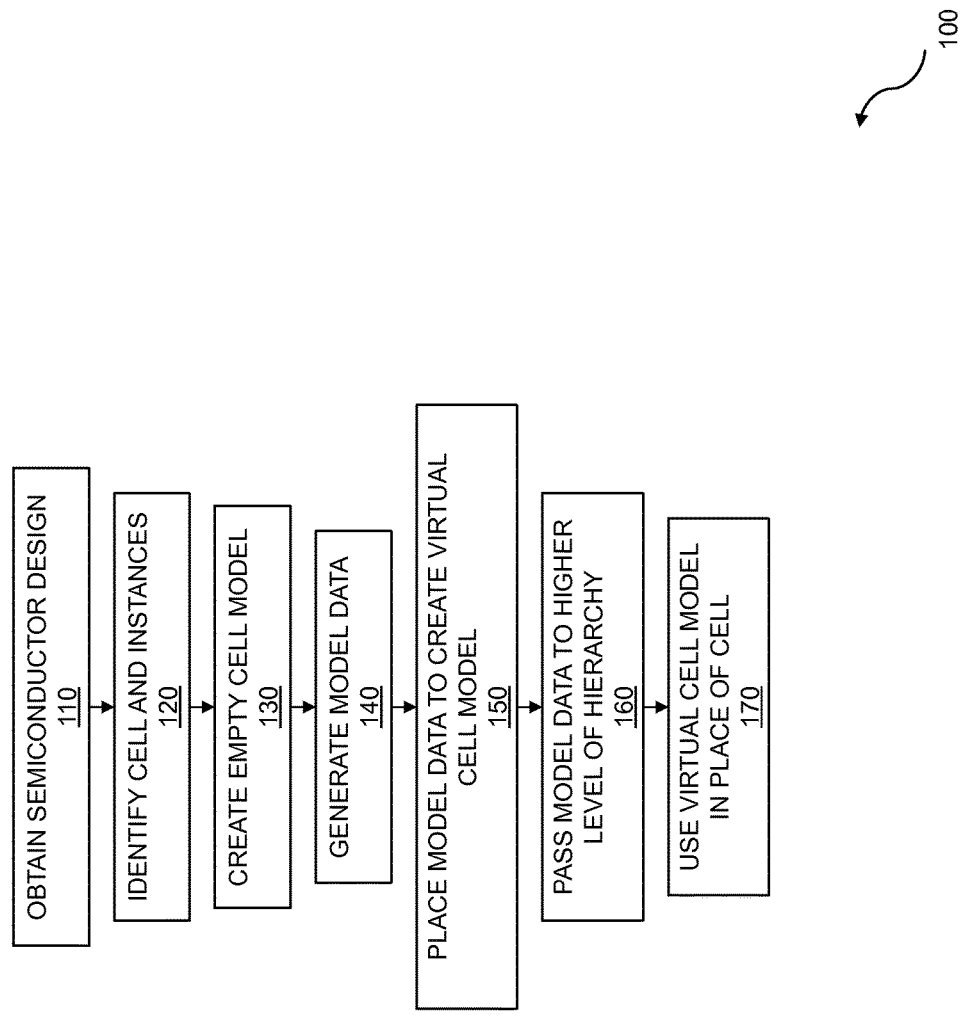
FIG. 1 is a flow for virtual cell model usage.

In embodiments of a virtual cell model, a compressed representation of an IC design cell is created and used a representation of the cell in the cell's parent cell or cells, resulting in both memory and runtime reductions in the developed hierarchical verification algorithms. The virtual cell model promotes an efficient single-pass bottom-up hierarchical processing in a DRC algorithm for the semiconductor manufacturing process. The virtual cell model can have several components which comprise a compressed representation of a current cell. The virtual cell model is built using a virtual hierarchical layer (VHL) in some embodiments. The VHL algorithms can be used to process hierarchical design layers as if all the layers were self-contained in the current design cell. Further, model data can be generated and passed up the hierarchy as needed for any cell-level geometric operation that can't be resolved in a cell.

Different types of model data can be devised to propagate various types of information from a child cell to parent cell. Each type of model data can be carried in a separate model channel from a child cell to a parent cell. The collection of the model data in the model channels can form a unique compressed virtual cell model for a cell that can be used in a parent cell's data processing. The compressed virtual cell model can the information from the child cell that the parent cell needs for further processing. Once the compressed model data has been generated for a cell, then the cell's cell-level data can be freed from memory. That is, the compressed virtual cell model, which has a much smaller memory footprint than the original cell, takes the original cell's place in the verification process. As the virtual cell models are generated for a parent's cell's child cells, the parent cell's data can be loaded into memory together with a virtual cell model for the data of its child cells data and thus be processed faster than if the full cell data for each child cell had to be loaded into memory. The virtual cell model can enable a single-pass bottom up hierarchical process, reducing memory usage, and providing a mechanism for creating a highly efficient, cell-level, parallel VHL algorithm.

Hierarchical physical verification of an integrated circuit (IC) is a complex process due to a multitude of hierarchical design styles that are created by IC design companies and other IC industry tools. The different design styles often result in extremely complex designs many levels deep and containing billions of cells and polygons overlapping each other throughout the hierarchy. In many verification methods, a hierarchical verification tool collapses the inefficient cell hierarchies and merges duplicate polygons to build a new hierarchy for the tool's individual command algorithms to use. Once the hierarchical tool builds its new hierarchy, then the layers stored at various levels of the newly-built hierarchy are processed in relation to each other based on the definition of the design rules and the unique geometric algorithms needed to verify the functionality of the design across the various layers. For example, a design rules for manufacturing (DRM) rule for a certain IC can require verification to be performed by executing a sequence of commands (algorithms) in a design rule checking (DRC) runset, with each algorithm in the sequence cycling through proximal layers in the hierarchy to produce a hierarchical result which then feeds subsequent commands until the DRM rule is satisfied. An algorithm can have many optimizations designed to avoid flattening of the algorithm's result (output layer). Without these algorithmic optimizations, hierarchical data flattening can cause the DRC algorithms to lose flexibility in processing by forcing cell data into ever larger chunks and creating extra processing time for the current algorithm and subsequent algorithms in the DRM rule.

Some hierarchical DRC methods are dependent on having the majority of the IC design layers loaded in memory before beginning the hierarchical algorithmic cycles that perform geometric operations on design data throughout the hierarchy. A hierarchical DRC method that loads an entire design layer has the advantage of having all of the instantiated cell data available in machine memory while cycling the geometric shapes throughout the hierarchy, which can result in reduced algorithmic complexity. The implementation of such a hierarchical algorithm involves cycling design layers through the hierarchy in order to search for algorithmic interactions between and among geometric shapes. The hierarchical cycling is typically performed as either single-layer cycling, dual-layer cycling, or for some complex algorithms, N-layer cycling. As the layer count increases for a hierarchical algorithm, so does the memory requirement to contain the required layers in memory, which becomes problematic for larger and larger designs. In fact, given the exploding size of modern IC designs, loading an entire design layer requires more memory than is feasible.

In response to the massive memory requirements of loading an entire design layer, several hierarchical DRC methods load only partial layers into memory, which reduces memory requirements for the hierarchical algorithms but increases algorithmic complexity and data loading time. For example, data loading time increases if all the layer data of a cell is not able to be kept in memory and the data must be reloaded each time one of the cell's multiple instantiations interacts with a hierarchical geometric shape being examined. Additionally, reloading the interacting data many times becomes a significant CPU performance issue. For example, if cell A is instantiated multiple times in a hierarchical design, and cell A's data has not been pre-loaded into memory, then every time a hierarchical layer's polygon is cycled through the hierarchy and interacts with an instantiation of cell A, cell A's data must be reloaded dynamically from the disk, resulting in significant CPU I/O. As the alternative method of loading the entire design layer into machine memory has already been mentioned as infeasible given the increasing complexity and decreasing node size of modern semiconductor designs, virtual hierarchical layers are herein presented as an alternative. Virtual hierarchical layers eliminate dynamic cell reloading, eliminate the need to load an entire IC design layer into memory, and provide a mechanism for cell-level, bottom-up algorithms for processing hierarchical layers.

Current hierarchical DRC methodologies typically exhibit a performance tradeoff between memory consumption and dynamic data load time. The Virtual Hierarchical Layer (VHL) described in U.S. patent application "Virtual Hierarchical Layer Usage" Ser. No. 14/634,695, filed Feb. 27, 2015, which is hereby incorporated by reference in its entirety, describes a method to reduce both memory and data load time by providing a bottom up cell-level processing technique. A VHL provides a snapshot of the hierarchical overlapping of shapes for a particular cell in a semiconductor design. U.S. patent application "Virtual Hierarchical Layer Patterning" Ser. No. 14/673,064, filed Mar. 30, 2015, which is hereby incorporated by reference in its entirety, describes a particular type of optimized virtual hierarchical layer (VHL) called a virtual hierarchical layer identical (VHLi). A virtual hierarchical layer identical (VHLi) includes geometric shapes that have the property of conveying identical layer patterns which encompass the global hierarchical information for all instances of a particular integrated circuit (IC) design cell. Methods of compressing VHL files are described in U.S. patent application "Virtual Cell Model Geometry Compression" Ser. No. 14/673,709, filed Mar. 30, 2015, which is hereby incorporated by reference in its entirety. Compression of the VHL data can reduce the memory footprint and computational resources required for the DRC process. A technique for generating a VHL is described in U.S. patent application "Negative Plane Usage with a Virtual Hierarchical Layer" Ser. No. 14/713,488, filed May 15, 2015, which is hereby incorporated by reference in its entirety. A negative plane is created and polygons which overlap an instance of a cell are pushed into the negative plane to create holes in the plane. The holed negative plane is then inverted to create the VHL.

In embodiments of the VHL, a hierarchical geometric layer is created for the purpose of performing an efficient hierarchical DRC process for verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information is collected by finding any geometric shape not contained by the cell (i.e., not in the current cell or in any of its descendants) that is overlapping any hierarchical placement of the current cell. The obtained hierarchical information is then used to compute the VHL. To gather the necessary geometric information regarding overlaps, all cells in the hierarchy are processed against the current cell's boundary. A two-step procedure is used for the hierarchical information propagation in some embodiments. First, it is determined whether or not the cell being processed can overlap with the current cell. Then, if there is a potential overlap, the geometric shapes in the cell are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell are collected for VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed are collected for VHL generation. In some embodiments, checks are performed to determine if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in indirect sibling cells that overlap with the current cell are collected for VHL generation.

4) If the cell being processed is the direct descendant of the current cell, no potential overlaps exist, and thus none of the cell's data is collected for VHL generation.

Once the hierarchical information has been collected, the VHL is calculated for the cell. Because the previously described procedures collect geometric shapes from other cells of the hierarchy which can have various placement orientations with respect to the current cell, each collected shape is transformed to reflect its geometric position relative to the placement of the current cell when the overlap occurs. The transformation process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell is stored as a shape in the VHL. In this way, related shapes are merged and form the VHL, which in turn provides a snapshot of the hierarchical overlapping for the cell.

In the embodiment described above, VHL information is generated for each cell only within its cell boundary. For example, if a geometric shape only abuts one placement of a cell, it will not show up in the VHL for the cell. Since it is important for some DRC algorithms to know the information surrounding the cell, in another embodiment of the shape generation, VHL shapes are collected from an additional area surrounding the cell boundary. This second embodiment collects shapes in the same way as the previous embodiment, but instead of the original cell boundary, an oversized cell boundary (a virtual boundary) is used for VHL calculation.

In such embodiments, the VHL is computed from collecting the hierarchical geometric shapes overlapping a cell's virtual boundary. In these cases, the VHL includes the accumulation of the data comprising the overlapping shapes that are pushed into a cell's virtual boundary and then merged into complex geometric shapes. The virtual boundary includes a cell's merged layer boundaries plus an additional cell margin referred to as an ambit. The ambit area is a ring-shaped area extended outside the original cell boundary and created by extending the cell boundary by a small value known as the ambit value. Creating an ambit is also referred to as oversizing the cell. Hierarchical data that overlaps the oversized current cell is pushed into the virtual boundary, with the overlapping data pushed from parent cells and sibling cells into the current cell. Hierarchical data that does not overlap the current cell boundary but does overlap the ambit portion is also pushed into the virtual boundary. As a result, the geometric shapes overlapping the ambit extension area are collected, and, along with the shapes overlapping the cell's actual boundary, are computed into the complete VHL for the cell. In this way, hierarchical information on potentially interacting shapes for a cell is stored in the VHL, even if the shapes are slightly outside of the cell's boundaries.

Some embodiments also include an apparatus that executes VHL hierarchical algorithms as independent cell-level processes. A VHL allows the cell-level processes to accomplish more cell-level data processing in the cell without flattening data out of the cell. The cell-level data processing for each VHL algorithm eliminates the need for reloading data and limits memory consumption, since the entire layer hierarchy is not loaded into memory. In an additional embodiment, a single cell is processed, start to finish, by an instance of the VHL cell-level process, which allows for significant parallelization and multi-threading across all cells in an IC Design.

A DRC algorithm that uses a VHL takes in the pre-generated VHL shapes together with the input data layers and performs cell-level geometric operations. As noted, the creation of the VHL is a separate process that occurs before the DRC algorithms begin. Existing DRC tools acquire hierarchical information as the DRC algorithms are cycling on the hierarchical geometric shapes, thus the collected information in the VHL can be fed in to existing DRC tools. A VHL is independent from any particular DRC algorithm; one VHL is not limited to use by a specific DRC algorithm. Thus, if two DRC algorithms are performed on the same input data layers, the two algorithms can share the same VHL. The sharing and reuse of the VHL also provides efficiency and flexibility for the implementation of DRC algorithms.

The VHL of a cell contains global hierarchical information about the cell, the global hierarchical information representing an accumulation of the overlapping data from the selected cell's parent and sibling cells. Geometric shapes from parent and sibling cells are pushed into the cell's boundary where they are merged into a set of VHL shapes. The VHL is generated for all commands in the runset, and the commands use the VHL shapes to process the cells in the hierarchy in a bottom-up fashion. The VHL algorithm's performance is heavily dependent on the number and geometric complexity of the VHL shapes. Embodiments described herein provide faster methods of creating the VHL shapes and the generation of simpler geometrical shapes for the VHL.

A virtual cell model can be generated using the VHL data. Embodiments of the virtual cell model involve providing the model data, which is a compressed representation of the unsolved geometric data for each cell in the hierarchy, and propagating the model data to the cell's parent cell through model channels. As the DRC algorithms move through the IC design's hierarchy to process the input data layer cell by cell, the virtual cell model is generated for each cell, and the original data of the cell is released from memory. Then, in the parent cell, the geometric information can be extracted from the virtual cell models to resolve geometric operations that were undetermined in the child cells. The virtual cell model concept addresses the memory bloat created by loading a large number of the design cells. The concept provides the ability to load only one cell at a time, promotes geometric processing using cell-level algorithms, and produces a compressed representation of a cell which can later be used by parent cells at a higher level in the hierarchy. After the virtual cell model is created for a cell, memory can be freed, which greatly reduces the memory usage for hierarchical geometric algorithms.

A DRC algorithm using the virtual cell model first generates the model data for various channels in each cell. To generate model data representing unsolved geometric operations in a cell, the algorithm can first decide whether the results of the cell-level operations are true or potentially false. The cell-level results can be inaccurate, false, or fake, as there can be geometric shapes from other cells (e.g. ancestors or siblings of the current cell) of the hierarchy overlapping one or more placement of the current cell which, when considered, can change the results. The overlapping information from the non-descendant cells can also be used by the DRC algorithms. One way to acquire such information can comprise using VHL shapes from the virtual hierarchical layer. The current cell can also generate undetermined results from overlapping data from its parent or sibling cells. After the cell-level results are computed, when building the virtual cell model of the current cell, the model data from the current cell's child cells is also examined. If the model data is still needed by the current cell's parent cells, the model data can be passed up one more level as a part of the current cell's virtual cell model.

Polygons contained within the parent cell and/or a sibling cell can interact with the cell. If the interacting polygons are from outside of the cell, the cell-level geometric operation cannot be resolved within the cell. The polygons, or shapes, which can interact with the cell can be in any hierarchical level of the semiconductor design. The interactions can be between the other shapes and shapes within the cell. The other shapes can include rectangles, rhombi, complex polygons, and so on. In some embodiments, the virtual cell model is generated using geometric processing with cell-level algorithms. Geometric processing includes geometric operations such as, but not limited to, union/merging, intersection, area calculation, length calculation, and Boolean operations. The cell-level algorithms can include DRC algorithms, DRM algorithms, and so on. The DRC and DRM algorithms can be part of a runset. The cell-level algorithms can result in a compressed representation of the cell, where the compressed representation can be used by parent cells and other cells which are contained within a higher level in the design hierarchy. The model data can be generated as a result of an unresolved geometric operation. An unresolved geometric operation can be passed to a parent cell for possible resolution. The cell-level data can be changed in the parent cells, and then the cell-level results can also be changed or invalidated in the parent cells. So, the hierarchical overlapping information is used in the model data generation. Some embodiments of the virtual cell model generation utilize the virtual hierarchical layer, but other embodiments can utilize other methods for finding the overlapping polygons.

After the different types of model data are generated, the memory that is storing the original cell-level data layer can be released. As shown by the above examples, the model data uses much less memory than the complete original data layer, but still carries all the geometric information needed by the parent cell. The model channels are responsible for delivering the model data to the parent cell. The model channels should deliver the model data to placements of the child cell in its parent, and translate the coordinates of the model data into the parent cell's coordinates.

To use virtual cell models, DRC algorithms can be developed with the knowledge of the types of virtual cell model channels that they use. As model data is delivered from the child cell to the parent cells, the DRC algorithms are responsible for interpreting the various model channels from the child cells. After being instantiated in the parent cell, the model data provides relevant geometric information from the cells below the current cell in the hierarchy. In another words, the use of the virtual cell model allows the DRC algorithms to access accurate geometric information from multiple levels of hierarchy below the current cell being processed. Combined with the parent's own cell-level data, the DRC algorithms can resolve undetermined results from the child cells. Also, the model data prevents the generation of false results in the parent's cell-level processing, due to lack of extraneous geometric information from the child cells.

From the perspective of memory usage, the virtual cell model has the advantage of loading much less data than the original data layer for the processing of each cell, because it only contains the unresolved data. Furthermore, for a bottom-up DRC algorithm, a virtual cell model can be freed after all its parent cells have been processed, thus reducing memory usage as the algorithm progresses up the IC design hierarchy. Current hierarchical DRC methodologies exhibit a performance tradeoff between memory consumption and data I/O time. The disclosed embodiment of the virtual cell model concept addresses the current performance issues by improving memory and load time.

Further Details

FIG. 1 is a flow diagram for using virtual cell models. The flow 100 describes a computer-implemented method for design analysis. The flow includes obtaining a semiconductor design 110 including a plurality of cells and a plurality of hierarchical design levels. The cells can be any of a variety of cells including logic cells, memory cells, switching cells, routing cells, and so on. The design levels can include hierarchical design levels, abstraction levels, etc. The hierarchical design levels can include cell levels, sub-module levels, module levels, subsystem levels, system levels, and so on. The abstraction levels can include behavioral levels, register transfer levels (RTL), circuit levels, physical design levels, and so on. The semiconductor design can be obtained from a library of design layouts which are stored in computer-readable formats. The design can be obtained by reading one or more of the computer files from one or more storage media, by being read from computer memory, by using an RTL design to generate a circuit design, by receiving design data entered by a user, by receiving wired or wireless communications, by scanning layout images, or any other method of obtaining a semiconductor design.

The flow 100 continues by identifying a cell and multiple instances of the cell 120 within a plurality of cells in a semiconductor design that includes the plurality of cells and a plurality of hierarchical design levels. The cell which is identified can be any of a variety of cells which are appropriate to the semiconductor design. The cell can be a digital cell or an analog cell, for example. Additionally, the cell can be a logic cell, a storage cell, a sensor cell, and so on. The cell can be contained in a design hierarchy. The design hierarchy can be abstract, behavioral, logical, structural, or any other type of hierarchy which is appropriate to the semiconductor design. The instances of the identified cell can appear throughout the levels of the design hierarchy. The cell and the instances of the cell can be identified for purposes including design rule checking (DRC), design rules for manufacturing (DRM), logic simulation, design analysis, design verification, design validation, and the like.

The flow 100 also includes creating an empty cell model 130 corresponding with the cell which was identified. An empty cell model can be created to receive various types of information including cell data, virtual hierarchical layer (VHL) data, and so on. The empty cell model can be used to accumulate model data. The cell model data can be accumulated for a variety of purposes including, but not limited to, simulating, analyzing, verifying, or validating the semiconductor design.

Generating model data 140 based on data within the cell and VHL shapes is shown in the flow 100. The generating of model data can be based on a DRC algorithm which uses a virtual cell model and can generate model data for various channels in a cell. In some embodiments, the generating of the model data is based on a cell-level geometric operation. The cell-level geometric operation can produce results which can be true or potentially false. In at least some cases, the cell-level geometric operation cannot be resolved within the cell. The results of the cell-level geometric operations can be inaccurate due to overlapping geometric shapes from other cells.

In at least some cases, the cell-level geometric operation cannot be resolved due to polygons interacting with the cell. The polygons can include rectangles, rhombi, complex polygons, or any other type of polygon. The polygons can be from other levels of the design hierarchy. In at least some cases, the polygons are from a parent cell or a sibling cell. A cell being analyzed can be contained within a parent cell, have sibling cells contained within the parent cell, or occupy another position in the design hierarchy. Any shape can interact with the cell. In some cases, shapes do not comprise polygons, but can include an isolated edge or a shape having curved sides. Thus, in some embodiments, the cell-level geometric operation cannot be resolved due to interactions with other shapes in the semiconductor design. A cell can also include shapes that are non-polygonal, such as an edge of a polygon, curves, or areas with non-linear boundaries; so, in some cases, the interactions are between the other shapes and shapes within the cell, where the other shapes are shapes from the semiconductor design that are not a part of the cell.

The flow 100 continues by placing the model data into the empty cell model 150 to create a virtual cell model. An empty cell model can remain empty depending on what, if any, model data is generated. The model data can include data within the cell and VHL shapes. The data within the cell can include shapes which interact with other shapes in the design hierarchy. Various types of model data can be included. The model data which is placed can be devised to propagate various types of information from child cells to parent cells. Each type of model data which is placed can be carried in a separate model channel between the child cell and its corresponding parent cell. Thus, in at least some embodiments, generating the model data includes building multiple model channels to carry model data from the current cell to the parent cell. The various channels allow relevant data to be imported into the empty cell model as needed. Various rules can apply to the placing of the model data into the empty cell model. In some embodiments, no shapes are placed in the virtual cell model when the interacting data cannot change a geometric operation. The cell model can remain empty, or it can simply receive no shapes, as a result of the processing of a geometric operation which cannot be changed by the data.

In some embodiments, the flow 100 also includes passing the model data to a higher level of hierarchy 160 within the plurality of hierarchical design levels. The model data which is passed to the higher level of the hierarchy can include data related to cell-level geometric operations which cannot be resolved within the cell. The model data can be communicated from the child cell to the parent cell via a model channel as described previously. In some embodiments, the model data includes partial shapes from the cell. The partial shapes can include shapes which cannot be resolved within the cell for geometric operations, for example. The passing of data can include polygons in order to provide context for the model data. The polygons can include rectangles, rhombi, complex polygons, and any other polygon appropriate to the semiconductor design. The context model data can include part of the model data which is not complete. The passing of the data can include a piece of a polygon that provides context for the model data.

The passing of the data can further include the removal of duplicate shapes. Duplicate shapes can result from the interactions between multiple instances of child cells and parent cells. The first instance of a given shape provides useful information to the model data. Additional instances of the shape provide redundant information and can therefore be removed without loss of integrity of the model data. The removal of the duplicate shapes can occur in the parent cell. The parent cell can accumulate the duplicate shapes from multiple instances of the child cell. The removal of the duplicate shapes from the parent cell can reduce the number of shapes in the parent cell and can reduce the complexity of the model. In embodiments coordinate transformations are performed as part of passing model data to a higher level of hierarchy in order to place virtual model data onto common coordinates. The transformations enable the parent cell to use the virtual cell model in place of the cell in design operations.

The flow 100 can optionally include using the virtual cell model in place of the cell 170 in design operations. The virtual cell model can be used in place of the cell for a variety of purposes including, but not limited to, analysis, simulation, verification, or validation of the semiconductor design. In embodiments, the virtual cell model provides a compressed representation of the cell. The cell-level algorithms can result in a compressed representation of the cell, where the compressed representation can be used by parent cells and other cells which are contained within a higher level in the design hierarchy. The compressed representation of the cell can contain all of the model data required by the parent cell for processing. The compressed representation of the cell can require fewer computational resources and can expedite processing of the parent cell. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
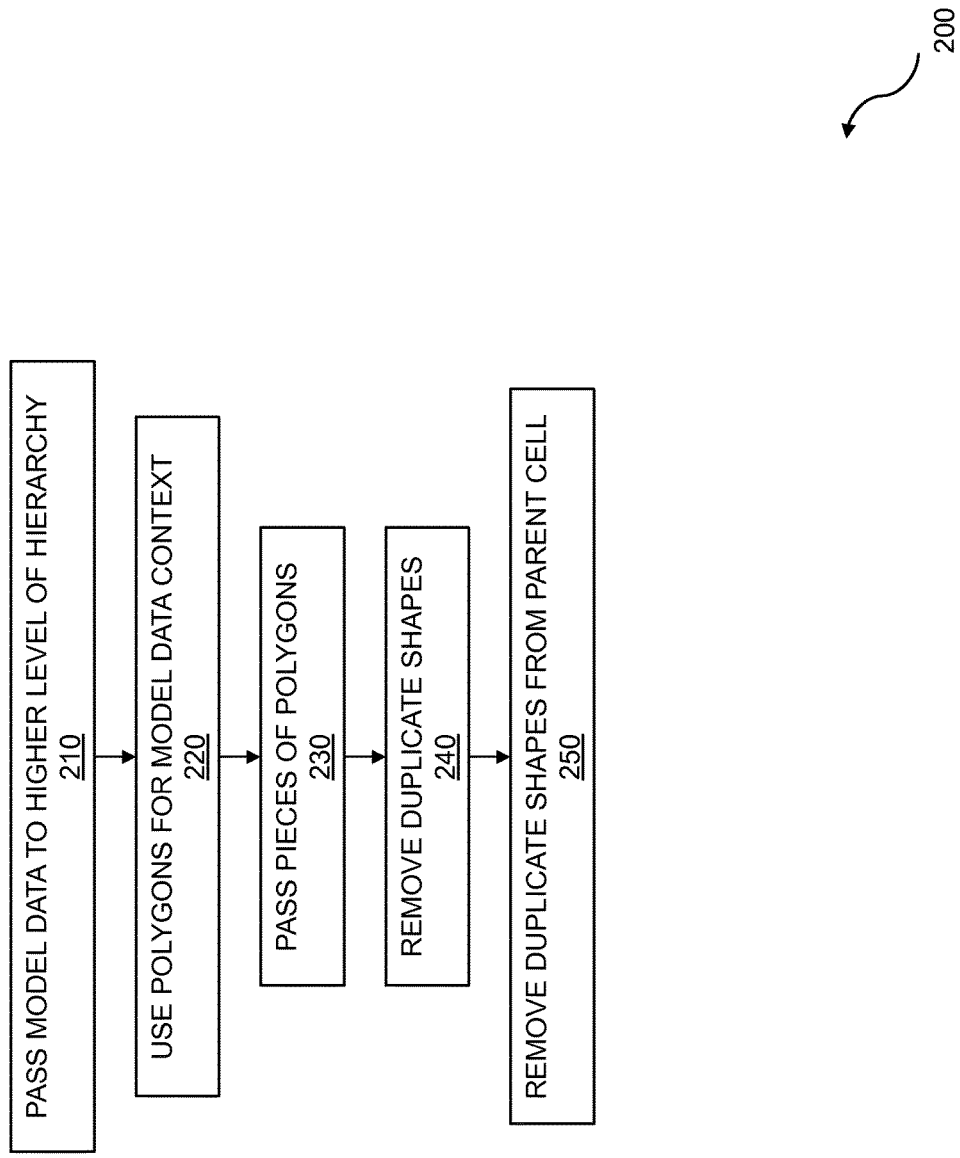
FIG. 2 is a flow for passing model data.

FIG. 2 is a flow for passing model data. The flow 200 describes a computer-implemented method for design analysis. The flow 200 describes a technique for passing model data among various levels of hierarchy. The flow 200 begins with passing model data to a higher level of hierarchy 210.

Model data for a cell can be generated based on data within the cell and VHL shapes as described previously. The model data for the cell can be used at various levels of the hierarchy within the semiconductor design. In some cases an instance of the cell may be a child cell of another cell. The model data for the child cell can then be passed to a parent cell, a parent of the parent cell, or another cell even higher in the hierarchy.

The flow 200 includes using polygons to provide context for the model data 220. The context complements the processing of the main model data in the parent cell. Context for the model data can be passed to indicate that a part of the main model data is not complete. Examples of polygons that can provide context for the model data include polygons that are adjacent to the main model data. The flow 200 includes passing pieces of a polygon that provides context for the model data 230. The piece or pieces of a polygon can be adjacent to a portion of the polygon passed in the model data.

The flow 200 includes removing duplicate shapes 240. Duplicate model data, including duplicate shapes, is an example of true model data that is represented multiple times and thus redundant. Removal of one of the copies of the duplicate model data, such as duplicate shapes, can reduce storage requirements and reduce the amount of data to be processed by the DRC commands. In embodiments, the flow 200 includes removing duplicate shapes in a parent cell 250. In some cases, a parent cell can have multiple instances of the same child cell which can represent a source of duplicate model data. Thus, in at least some embodiments, the removal occurs in a parent cell. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
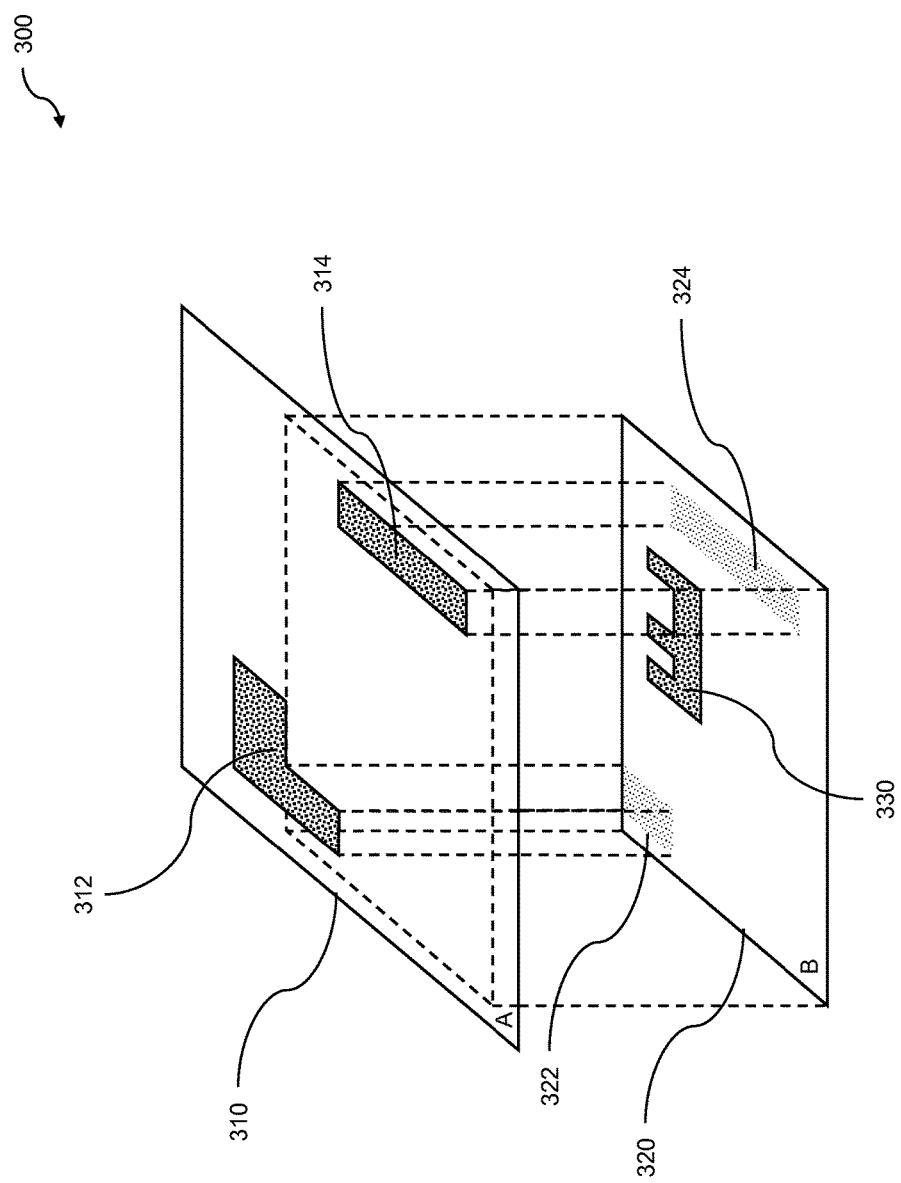
FIG. 3 illustrates a case in which all shapes are processed at the cell-level and therefore the virtual cell model is empty.

FIG. 3 illustrates a case in which all shapes are processed at the cell-level and therefore the virtual cell model is empty. As an example, the design 300 with two-level hierarchy is the input to an area command. The polygons 312 and 314 are included in the cell-level data in cell A 310, and the polygon 330 is included in the cell-level data in cell B 320. The polygon 322 shows the part of the polygon 312 of cell A 310 that overlaps cell B 320. Similarly, the polygon 324 shows the part of the polygon 314 of cell A 310 that overlaps cell B 320. The example hierarchical area command computes the area of a whole geometric shape residing in the semiconductor design, which can extend over multiple levels of the hierarchy. Thus, a VHL algorithm for the area command must process all shapes abutting and overlapping each other in the hierarchy to accurately calculate the value of the area. In the design 300, neither the polygon 322 nor the polygon 324 overlap the polygon 330 of cell B 320, so the area of the polygon 330 is not changed by the hierarchical data. Therefore, no model data is generated for cell B 320. If the cell-level data generates results that cannot be changed by overlapping data from parent or sibling cells, and if the cell-level data will not change any results generated in the parent cells, no model data needs to be generated.

Figure 4:
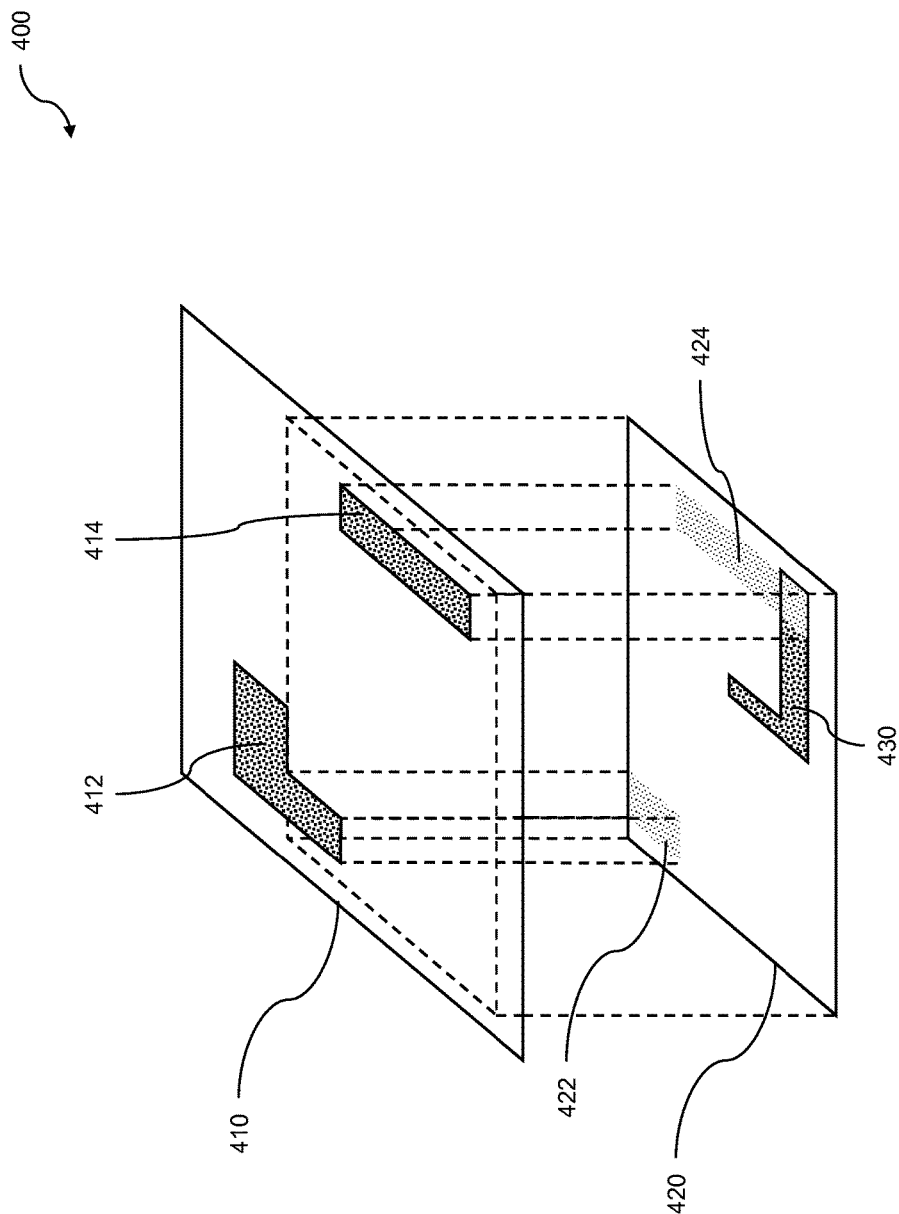
FIG. 4 depicts an example design hierarchy with two levels as the input to an example DRC command.

FIG. 4 depicts an example design hierarchy with two levels as the input to an example DRC command. The design 400 includes a parent cell 410 that includes a first polygon 412 and a second polygon 414 as cell data. The parent cell 410 also includes an instance of a child cell 420 that includes a third polygon 430. The first polygon 412 and the second polygon 414 overlap the child cell 420. The first overlapping polygon 422 shows the shape of the overlapping area of the first polygon 412 and the child cell 420, which is only a part of the first polygon 412. The second overlapping polygon 424 shows that the entire second polygon 414 overlaps the child cell 420. Note that the second overlapping polygon 424 interacts with the third polygon 430 of the child cell 420. Because the third polygon 430 of the child cell 420 interacts with at least one shape from a parent or sibling cell (in this case a parent cell), the area of the shape in the final semiconductor design that includes the third polygon 430 cannot be determined using only the information included in the child cell 420 and is therefore unresolved within the cell. So, the third polygon 430 is generated as model data and placed in an empty cell model corresponding to the child cell in order to create a virtual cell model. This is an example of generating model data based on a cell-level geometric operation that cannot be resolved within the cell due to polygons of a parent cell interacting with the current cell.

Figure 5:
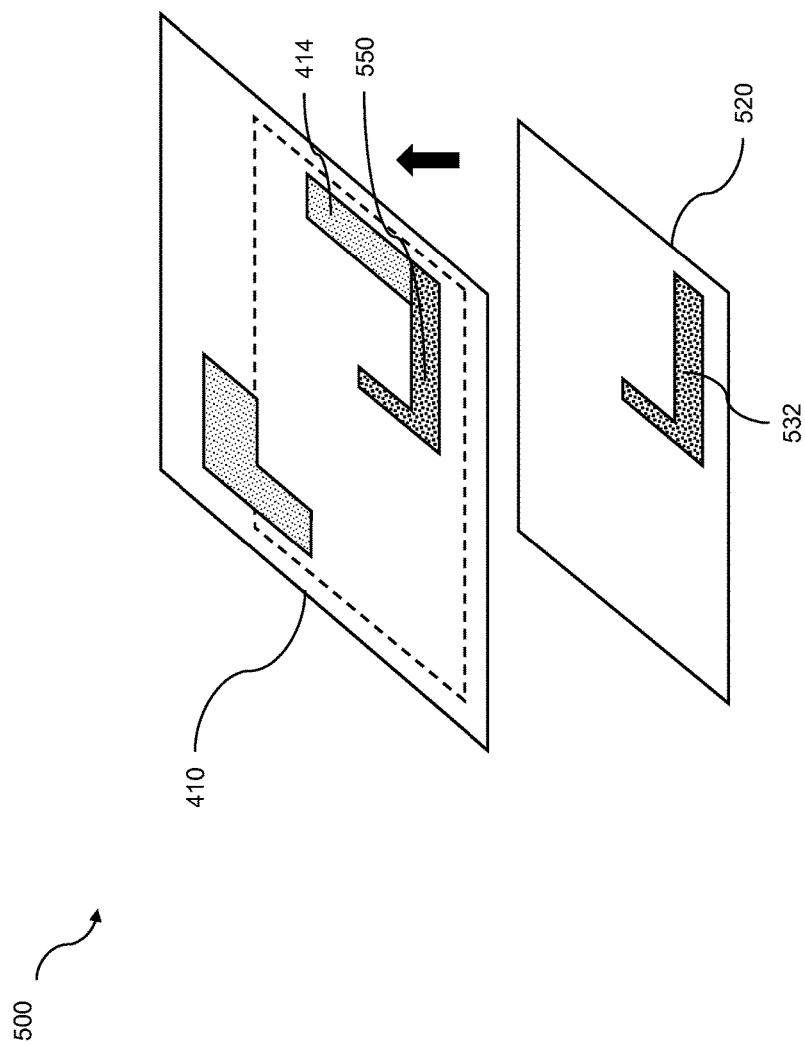
FIG. 5 illustrates the virtual cell model generated for the child cell in the design of FIG. 4.

FIG. 5 illustrates the virtual cell model generated for the child cell in the design of FIG. 4. The drawing 500 shows a virtual cell model 520 for the child cell 420. The virtual cell model 520 includes a polygon 532 as the model data which was generated based on the cell data for the child cell 420 and the interactions of the cell data with overlapping polygons from parent cells, which could have been taken from VHL shapes for the child cell 420.

The virtual cell model 520 is then passed to the parent cell 410, i.e. a higher level of hierarchy within the plurality of hierarchical design levels. This passing allows the parent cell 410 to determine the area of the shape that includes the polygon 430 from FIG. 4 that originated in this particular instance of the child cell 520. In this example, the area of the resultant polygon is the area of the union of the second polygon 414 and a polygon 532 of the virtual cell model 520. This allows the hierarchical overlapping to be resolved.

In embodiments, if the results generated by cell level processing can be changed by the overlapping data from parent or sibling cells, i.e., the results are undetermined or unresolved, model data is generated and sent to the parent cell. In this case, the cell-level operation with the data in the cell generates results that may or may not be changed in the parent cell. For example, when a geometric shape from the hierarchy outside a cell overlaps with a placement of the current cell, the shape can change or invalidate the results generated from the cell-level operations within the cell. Therefore, the undetermined results should not be generated for that cell, and instead should be re-created in the parent cell, where there is sufficient information to determine if the results are true results.

Figure 6:
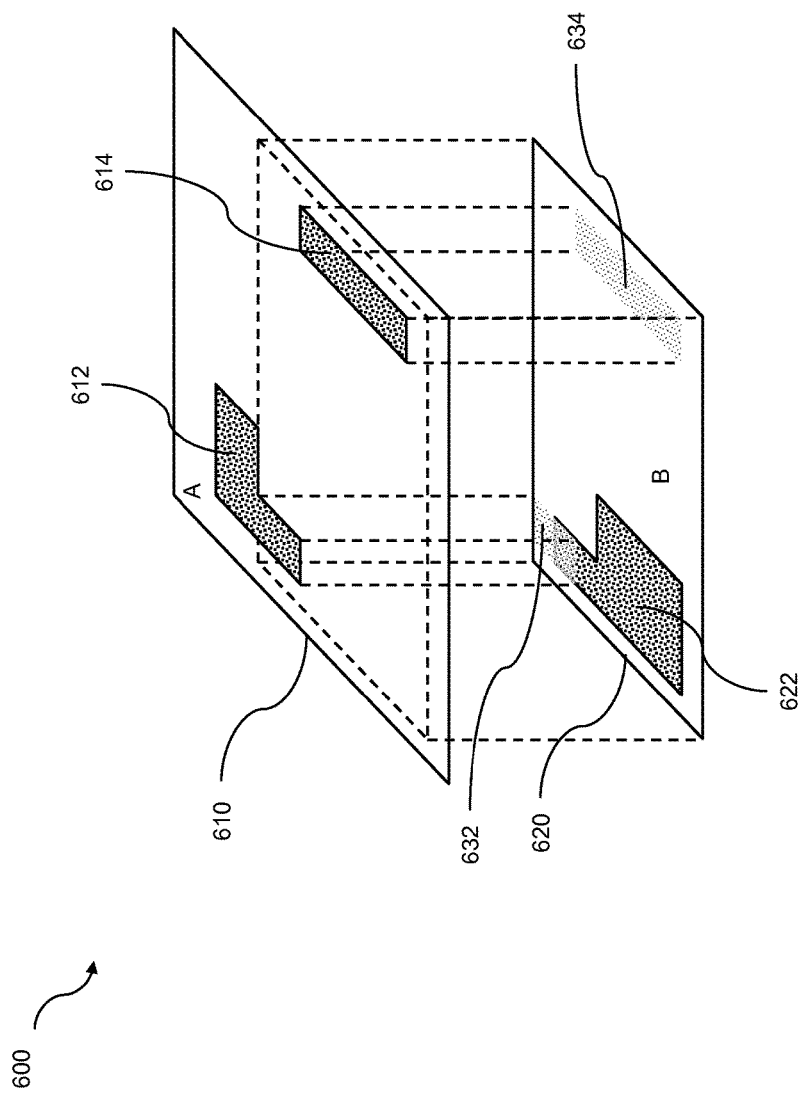
FIG. 6 depicts an example design hierarchy with two levels as the input to an example DRC command.

FIG. 6 depicts an example design hierarchy with two levels as the input to an example DRC command. A DRC command for finding area is used in this example, but other commands could be used in other cases. The design 600 includes cell A 610 with a first polygon 612 and a second polygon 614 also shown as local data for cell A 610. Cell A 610 also includes an instantiation of cell B 620. Cell B 620 includes local data of a polygon 622. In some embodiments, the area is checked to see if the polygon 622 is larger than a predetermined area as defined by a part of the area command. If the polygon 622 is smaller than the predetermined area, it is ignored in some embodiments.

The first polygon 612 of cell A 610 partially overlaps cell B 620 as shown by the overlapping portion 632, including a portion of the polygon 622. The overlapping portion 632 means that the area of the feature of the semiconductor design might be larger than the area of the polygon 622 alone. The overlapping portion 632 can then be used to create a virtual cell model for cell B 620. The second polygon 614 overlaps cell B 620 as shown by the overlapping portion 634, but does not interact with any of the local data of cell B 620 so the second polygon 614 is not included in the virtual cell model.

Figure 7:
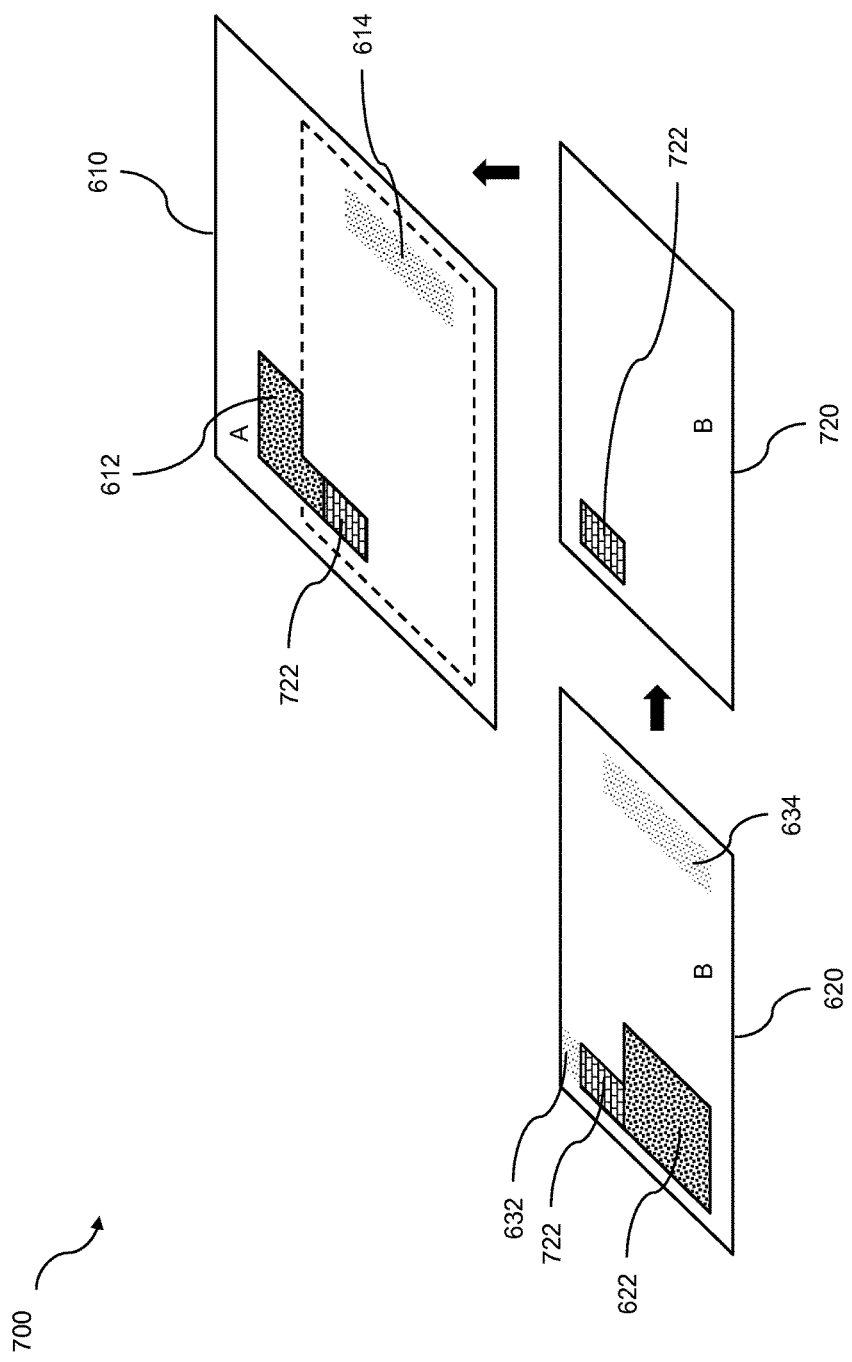
FIG. 7 illustrates the model data generated for the child cell in the design of FIG. 6.

FIG. 7 illustrates the model data generated for the child cell in the design of FIG. 6. The drawing 700 shows cell B 620 with the local data polygon 622 it contains and overlapping portions of the polygons 632 and 634 from cell B's parent cell. A new shape 722 is also shown, representing the intersection of the local data polygon 622 and the overlapping portion 632.

A virtual cell model 720 is also shown in the drawing 700. The virtual cell model 720 is created based on the cell data for cell B 620 and the overlapping portions of shapes, 632 and 634, from parent cells; shapes which could have been taken from VHL shapes for cell B 620. The virtual cell model 720 includes the shape 722 representing the intersection of the local data polygon 622 and the overlapping portion 632 as a selector model, a concept which is described further below. The virtual cell model 720 for cell B 620 is then passed to the parent cell 610 at a higher level of the hierarchy, where the model data, in this case comprising the shape 722, can be used in conjunction with shapes already contained in the higher-level cell such as the shape 612 and the shape 614 to resolve a DRC command.

If the data contained in the cell can affect results generated in the parent cell, model data can be generated to inform the DRC algorithm processing the parent cell, so that the correct results can be generated in the parent cell. A simple example for this case is illustrated when a geometric shape from a cell overlaps with shapes in the cell's parent cells. If geometric operations on the shapes in a particular parent cell are generating results, the overlapping shape in the child cell can change or invalidate the results. Therefore, it is important that the DRC algorithm processing the parent cell has access to information regarding overlaps, so that it can consider the existence of an overlapping shape in the child cell and generate correct results.

One straightforward method of model data generation is to replicate all geometric shapes for the above cases as shown in FIGS. 4-7, and flatten them all to the parent cell. However, different types of model data can be generated, each as a different representation of the child cell's unsolved data. Combining the different types of model data delivered through different model channels, the virtual cell model is able to provide much more hierarchical information, from child to parent cells, for improving DRC algorithms without data flattening.

After the different types of model data are generated, the memory storing the original cell-level data layer can be released. Model data uses much less memory than the complete original data layer, but still carries all the geometric information needed by the parent cell. The model channels are responsible for delivering the model data to the parent cell. The model channels deliver the model data to all placements of the child cell in their parent cells, and translate the coordinates of the model data into the parent cells' coordinates.

Some embodiments of the virtual cell model build multiple model channels carrying different types of model data from child cells to parent cells. Discriminating model types developed in the virtual cell model, if designed efficiently, can serve the purpose of model data compression, and thus result in the memory reduction and runtime efficiency for the DRC algorithms.

In at least one embodiment, a main model channel is built. Model data can be selected from the cell-level data to provide for the presentation of data in the child cell for unresolved geometric operations. The model data includes the main model data, which can be generated from the original data layer in the cell. Shapes or partial shapes from the original data layer can be selected as the main model data; shapes converted from the original data layer (e.g. edges converted from polygon shapes) can also be selected as the main model data. The main model data can be delivered through the main model channel to parent cells.

Revisiting the example shown in FIGS. 6 and 7, providing multiple model channels can create a more efficient algorithm. In the example shown for the design 600, the polygon 622 in the child cell B 620 already has an area large enough to be selected as a result. Then, no matter what shape is interacting with the result in the child cell, the area of the polygon would only grow larger, and the polygon should therefore be selected as the result. If using the main model only, the hierarchical area algorithm needs to send up the whole polygon in child cell B 620, merge it in the parent cell A 610, and then select the whole merged shape as the result. By adding a selector model channel, a more efficient algorithm can be used where a partial overlap 722 of the polygon 622 in cell B 620 is selected; an overlap which is interacting with the polygon 612 in the parent cell A 610. Then in the parent cell A 610, the shapes, such as polygon 612, touching the selector model data that overlaps the shape 722, from the virtual cell model 720 for the cell B 620 are selected as the result.

The selector model data can be generated containing geometric shapes as positive/negative selectors. The selector model channel can be built to deliver the selector model data so that the DRC algorithm quickly decides in the parent cell if a result can be generated or not. This type of virtual cell can be useful for selection operations requiring complete shapes, such as complete polygons or complete edges, as results. An example would be the area command. If a geometric shape in the child cell can be determined to be a true result, then any shape interacting with the cell in the parent cell is also a true result.

In embodiments, generating model data is based on a cell-level geometric operation. If the cell-level geometric operation cannot be resolved within the cell due to polygons from a parent cell or a sibling cell interacting with the cell, generating the model data can include building multiple model channels to carry model data from the cell to the parent cell. Generating model data for a selector model channel includes identifying an overlapping polygon from the polygons, selecting a portion of the overlapping polygon, wherein the portion is smaller than the entire overlapping polygon, and sending the portion to the parent cell via the selector model channel.

Figure 8:
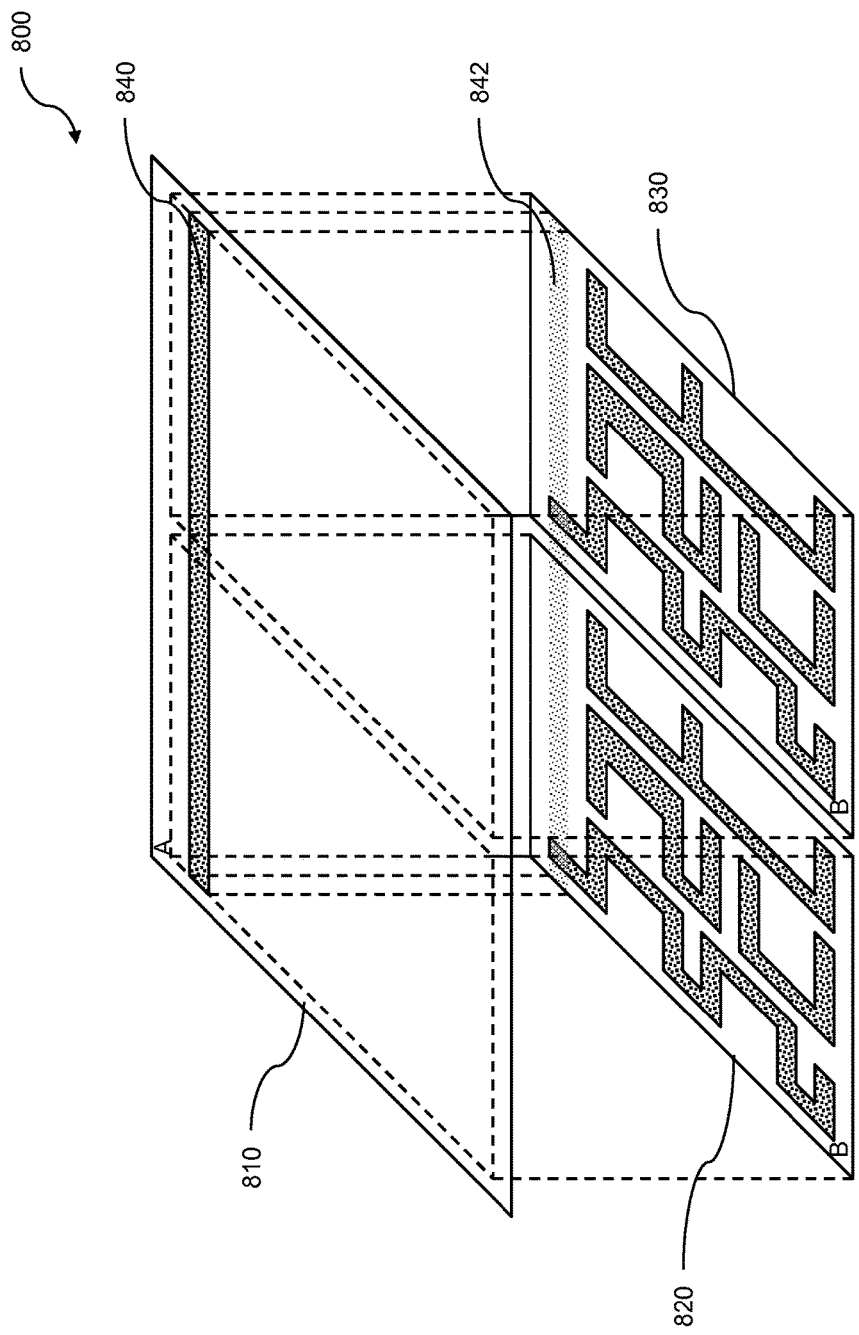
FIG. 8 depicts an example design used as the input to an example DRC command.

FIGS. 8-16 show an example hierarchical design evaluated using an example DRC command sections to demonstrate the building of multiple model channels. The example DRC command, a hierarchical "length_edge" command, computes the whole length of an edge residing in the hierarchy. FIG. 8 depicts an example design used as an input to an example DRC command. The input design 800 can include a parent cell A 810 that has a single polygon 840, a first instantiation of a child cell B 820 and a second instantiation of the child cell B 830. The two instantiations of cell B 820 and 830 include four complex polygons. The polygon 840 of cell A 810 overlaps both instantiations of cell B as shown by the polygon 842 which can be pushed from the cell A 810 to the child cells 820 and 830 as VHL data.

Figure 9:
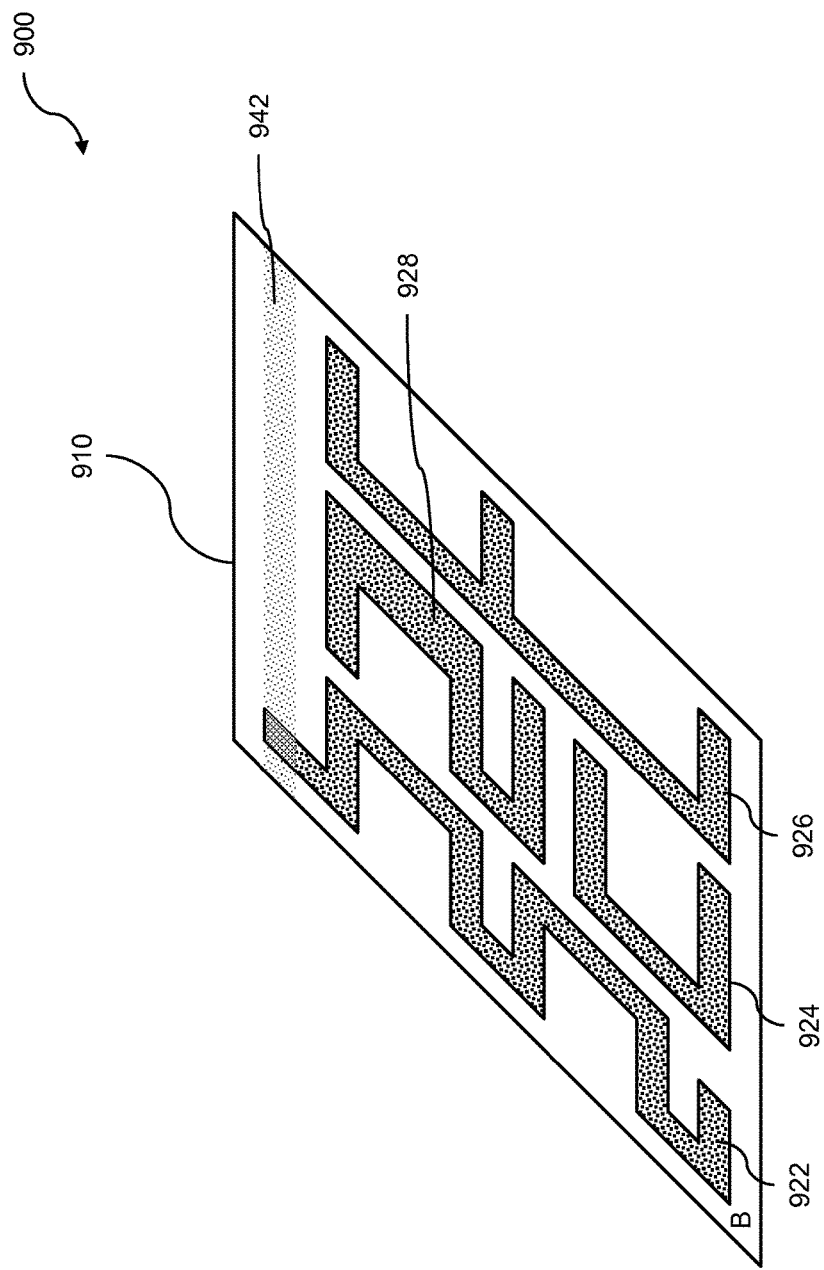
FIG. 9 shows the cell-level data of the child cell B in the design of FIG. 8, with a potential overlapping shape from the parent cell A.

FIG. 9 shows the cell-level data of the child cell B in the design of FIG. 8, with a potential overlapping shape from the parent cell A included. The drawing 900 shows cell B 910 with its local data, a first polygon 922, a second polygon 924, a third polygon 926, and a fourth polygon 928 along with the VHL shape 942 representing a shape pushed from the parent cells of cell B 910. As shown in FIG. 8, the polygon 840 of the parent cell A 810 overlaps both instantiations of cell B 820 and 830 in the same location; both overlaps are combined into the single VHL shape 942. Note that the shape 942 overlaps the first polygon 922, but does not interact with the second polygon 924, the third polygon 926, or the fourth polygon 928.

Figure 10:
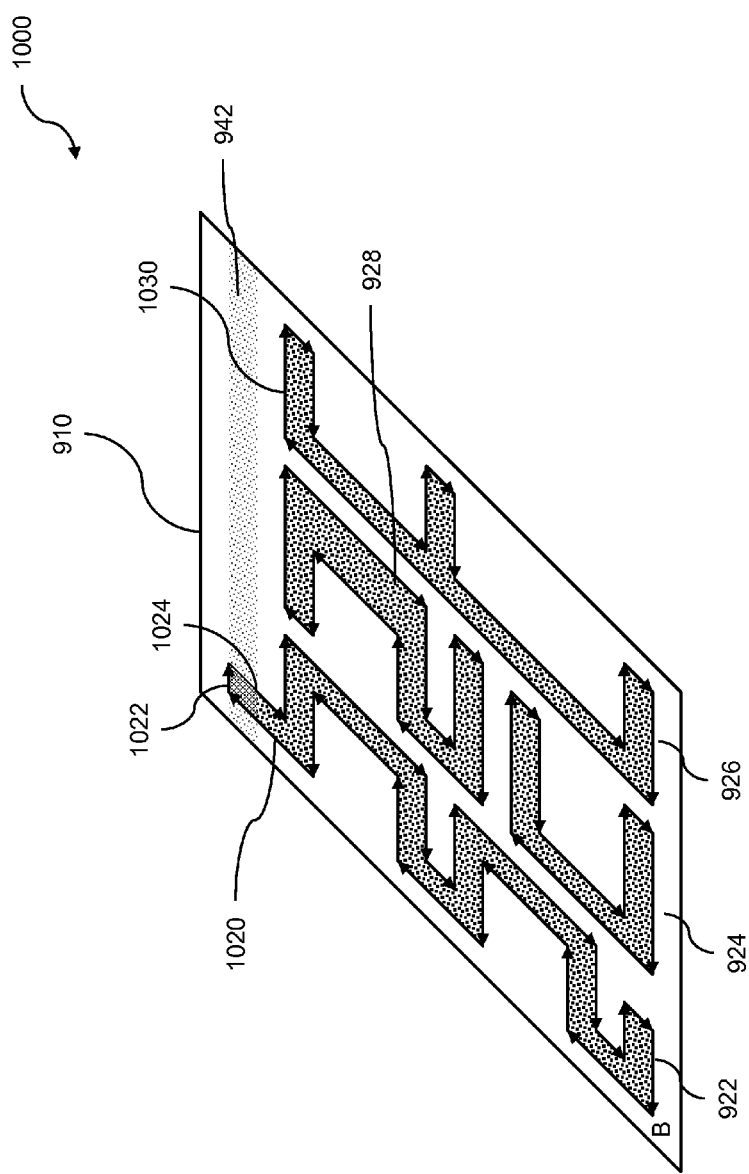
FIG. 10 shows the cell-level result of the example DRC operation in the child cell B, including the true results and the undetermined results.

FIG. 10 shows the cell-level result of the example DRC operation in the child cell B, including the true results and the undetermined results. The drawing 1000 shows cell B 910 and its main model data, a first polygon 922, a second polygon 924, a third polygon 926, and a fourth polygon 928. In this example, a DRC "length_edge" command is used to find the edge lengths of the final shapes of the input design 800. The algorithm of the "length_edge" command processes the child cell B 910 to determine the length of the edges as shown by the arrows in the drawing 1000. Some of the edge lengths can be resolved using only the data in cell B 910, such as the edge 1030 of the third polygon 926, because the edge does not interact with shapes from its parent cell A 810 in the design 800.

The edges 1020, 1022, and 1024, however, interact with the polygon 942 which means that the "length_edge" command cannot be resolved using only the local data within cell B 910 because the final length can change due to the overlapping data from the parent cell A 810. Multiple model channels can be utilized to resolve the edges 1020, 1022, and 1024 that interact with polygons from outside of the cell.

One model channel in embodiments is the main model data channel. To save memory usage, the amount of the main model data can be minimized. One way to minimize, or compress, the model data is by selecting partial shapes from the original data layer, instead of using the whole shapes as the model data.

Figure 11:
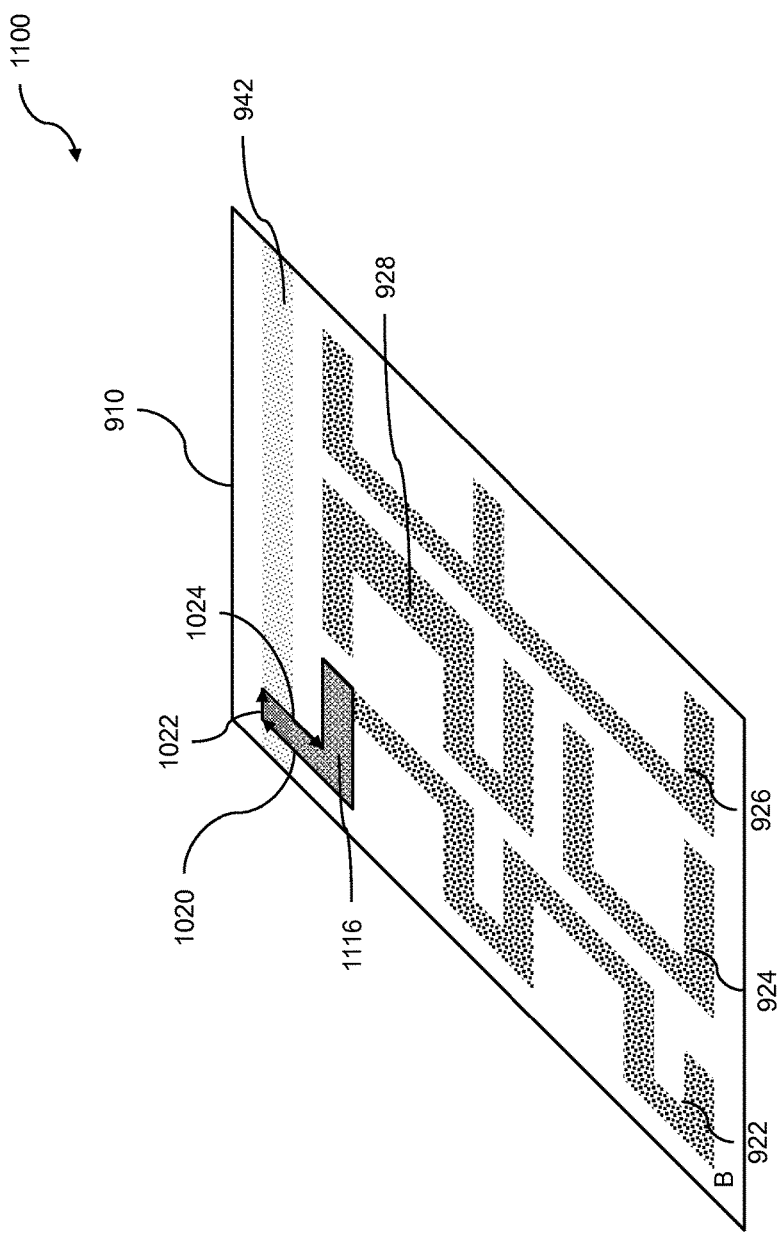
FIG. 11 shows compressed main model data generated for the child cell B.

FIG. 11 shows compressed main model data generated for the child cell B. The drawing 1100 shows cell B 910 and its main model data, a first polygon 922, a second polygon 924, a third polygon 926, and a fourth polygon 928. The VHL shape 942 shows the position of shapes from parent cells (and sibling cells in some cases) of the various instantiations of cell B 910. A VHL algorithm for the "length_edge" command processes edges abutting and overlapping each other in the hierarchy to accurately calculate the length of an edge. In this example, the true length of edges 1020, 1022, and 1024 cannot be resolved by the "length_edge" command using only the main model data of cell B 910 due to the edges' overlap with the shape 942. As was previously discussed, the polygons that do not overlap with the shape 942, the second polygon 924, the third polygon 926 and the fourth polygon 928, are not passed to the parent cell as model data. In some embodiments, however, the full complex first polygon 922 is passed to the parent call as model data through the main model data channel. But in other embodiments, only a portion of the first polygon 922 is passed to the parent cell through the main model data channel. In the example shown, a shape 1116 is determined to incorporate the edges 1020, 1022, and 1024 that cannot be resolved locally within cell B 910. By only passing the shape 1116 to the parent cell A 810, the main model data is effectively compressed, or reduced in the main model data channel. Once the parent cell A 810 has the compressed data from the child cell B 910 through the main model data channel, the true length of the edges can be determined by the "length_edge" command.

Because the geometric information contained in the partial shapes of the main model data is incomplete, more data needs to be sent up through complementary model channels to prevent possible false or missing results in the parent cell, in at least some embodiments where the main model data passed is compressed. Some other model channels can be configured to allow for processing the parent data more efficiently. Some example complementary model channels are described below, but other types of model channels can be used in other embodiments.

Figure 12:
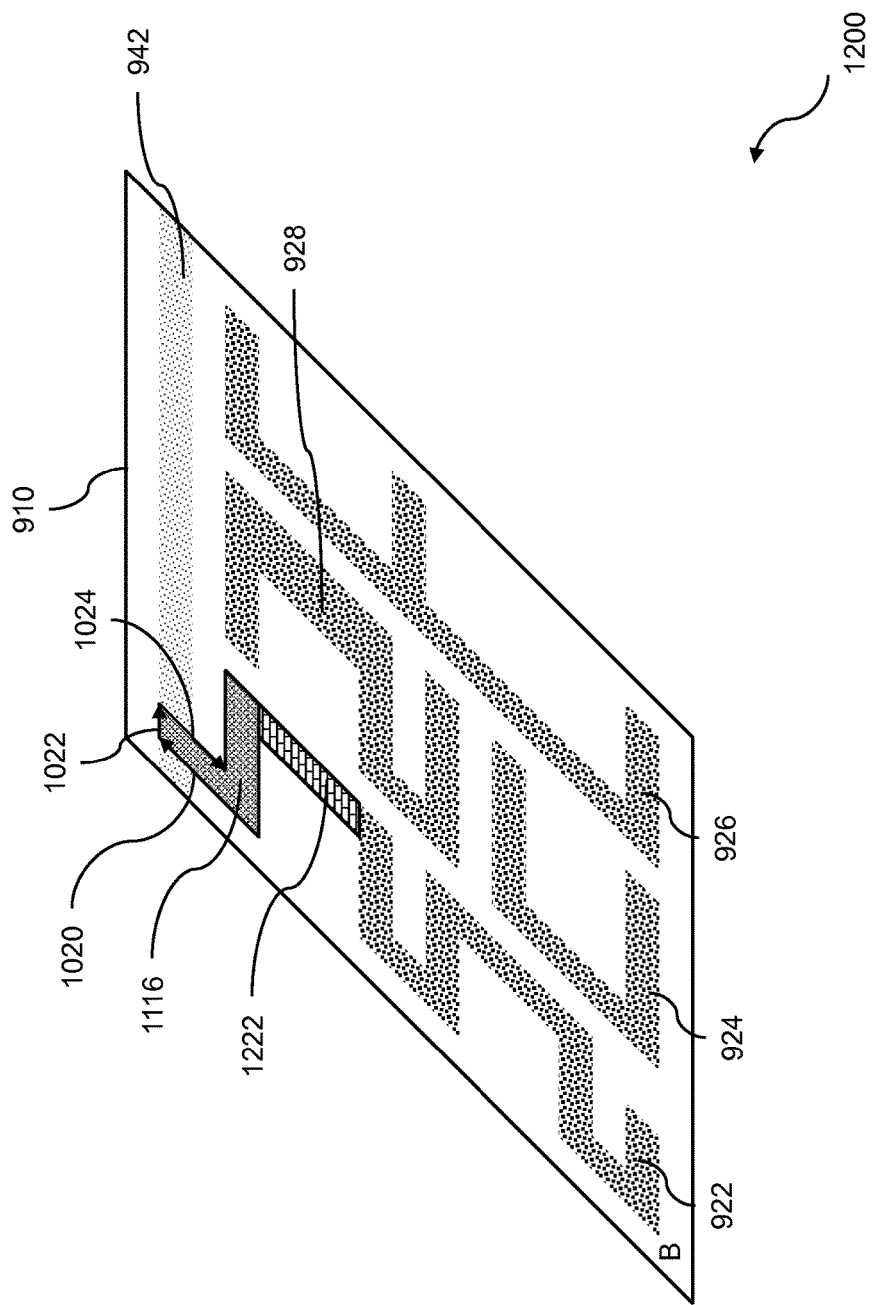
FIG. 12 shows the context model data generated for the child cell B.

FIG. 12 shows the context model data generated for the child cell B. Context model data can be generated to complement the processing of the main model data in the parent cell. Context model data can be sent through the context model channel. Typically, the context model data is generated to indicate the part of the main model data that is not complete. As shown in the drawing 1200, the compressed main model data for cell B 910, shown as the polygon 1116, is passed up to the parent cell A, where it can resolve the three edges 1020, 1022, and 1024 that are undetermined results in the child cell B 910. However, the main model data contains an incomplete portion, which can be further resolved by an additional piece, e.g. the polygon 1222. In this case, an additional context model channel can be built to send the extra piece of the polygon 1222 as context model data to the parent cell. With this context data, the "length_edge" algorithm can resolve the incomplete portion, i.e., the interacting part between the compressed main model data, the polygon 1116, and the context model data, the polygon 1222, so that no false result is generated from the compressed main model data.

Figure 13:
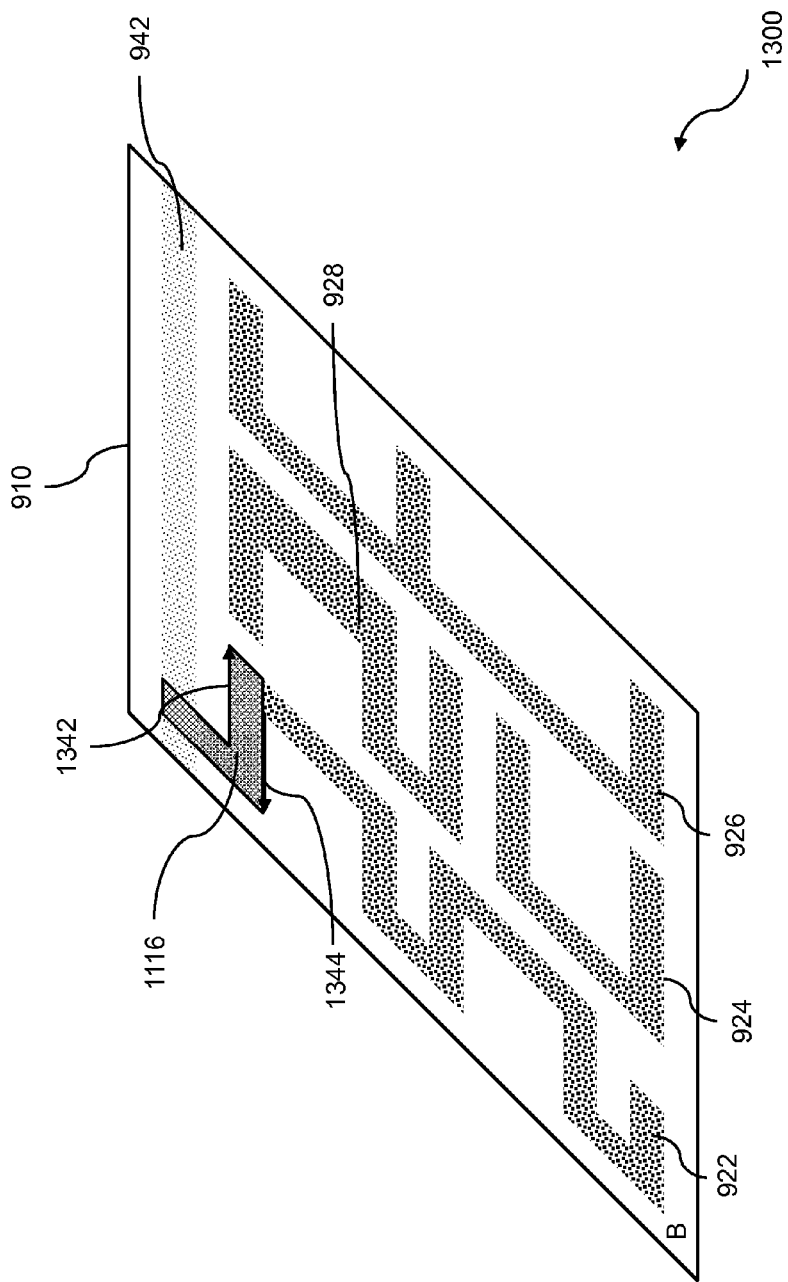
FIG. 13 shows the duplicate model data generated for the child cell B.

FIG. 13 shows the duplicate model data generated for the child cell B. The duplicate model data is generated and delivered through the duplicate model channel to remove the duplicated true results in the parent cell. While main model data is used to resolve undetermined results in the parent cell, the passed data can also re-create true results that are already written out in the child cell. The duplicate results can be eliminated to reduce disk storage processing in the following DRC commands. Since main model data is flattened and merged with data in the parent cell, it is possible that some edges will be regenerated by the shapes from the main model data. The compressed main model data includes the polygon 1116 which has edges 1342 and 1344. Those edges are also true edges of the complex polygon 922 which can be resolved locally within cell B 910. So, if the parent cell also generates the edges 1342 and 1344, they could be duplicates of the edges created within the child cell B 910. By passing the duplicate edges 1342 and 1344 to the parent cell through the duplicate model channel, the parent cell can use the information to remove the duplicate copy of the edges 1342 and 1344 in the parent cell.

In embodiments, generating model data is based on a cell-level geometric operation. If the cell-level geometric operation cannot be resolved within the cell due to polygons from a parent cell or a sibling cell interacting with the cell, generating the model data can include building multiple model channels to carry model data from the cell to the parent cell. Generating model data for a duplicate model channel includes identifying one or more edges to be removed in the virtual cell model and sending the one or more edges to the parent cell via the duplicate model channel.

Figure 14:
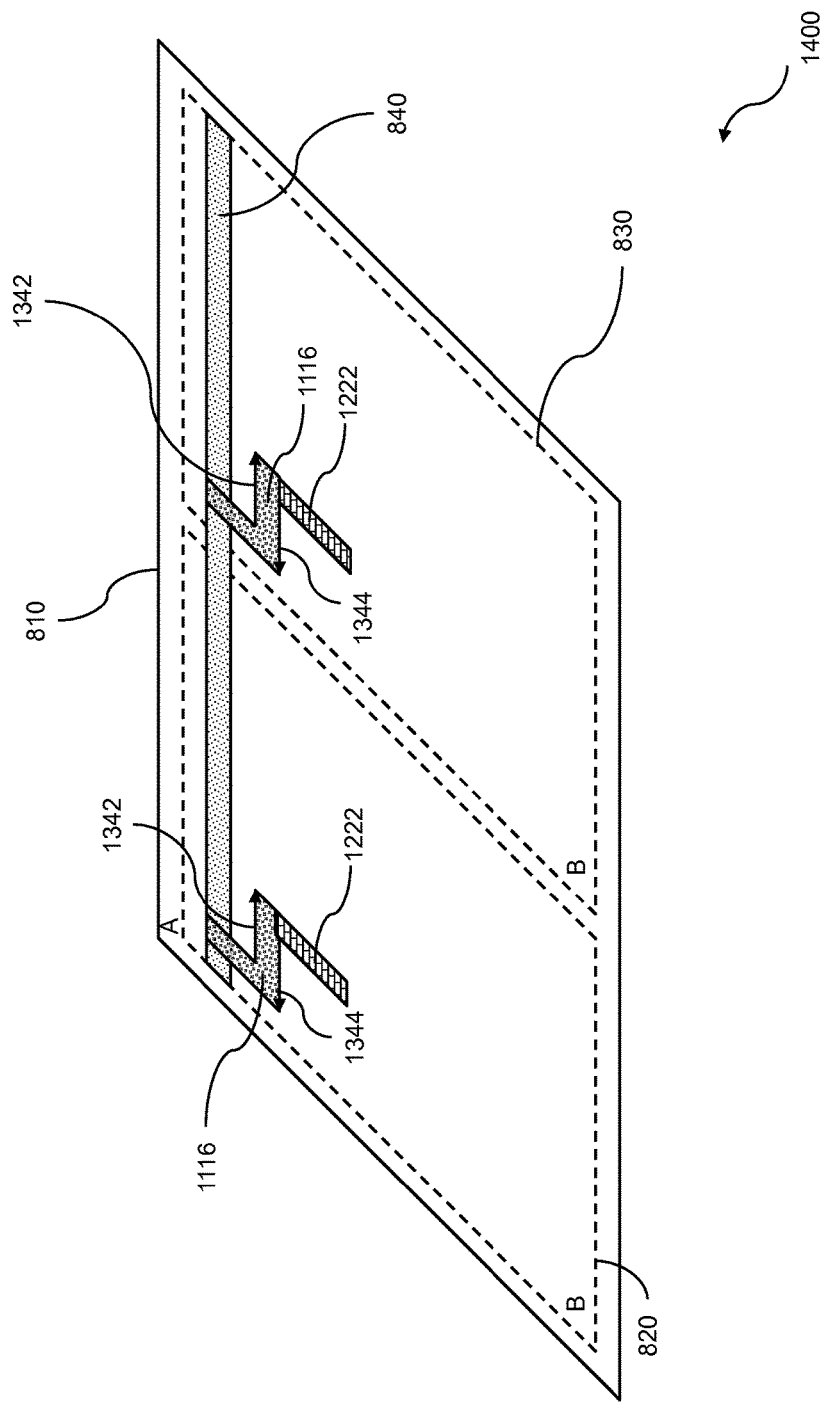
FIG. 14 shows the main model data, context model data, and duplicate model data delivered from the child cell B to the parent cell A.

FIG. 14 shows the main model data, context model data and duplicate model data delivered from the child cell B to the parent cell A. As shown by the drawing 1400, the parent cell A 810 receives the compressed main model data 1116 through the main model channel, the context model data 1222 through the context model channel, and the duplicate model data 1342 and 1344 through the duplicate model channel from the first instance of cell B 820. The parent cell A 810 also receives the compressed main model data 1116 through the main model channel, the context model data 1222 through the context model channel, and the duplicate model data 1342 and 1344 through the duplicate model channel from the second instance of cell B 830. The DRC "length_edge" command then can process the cell A 810 to determine the length of the relevant edges it contains.

Figure 15:
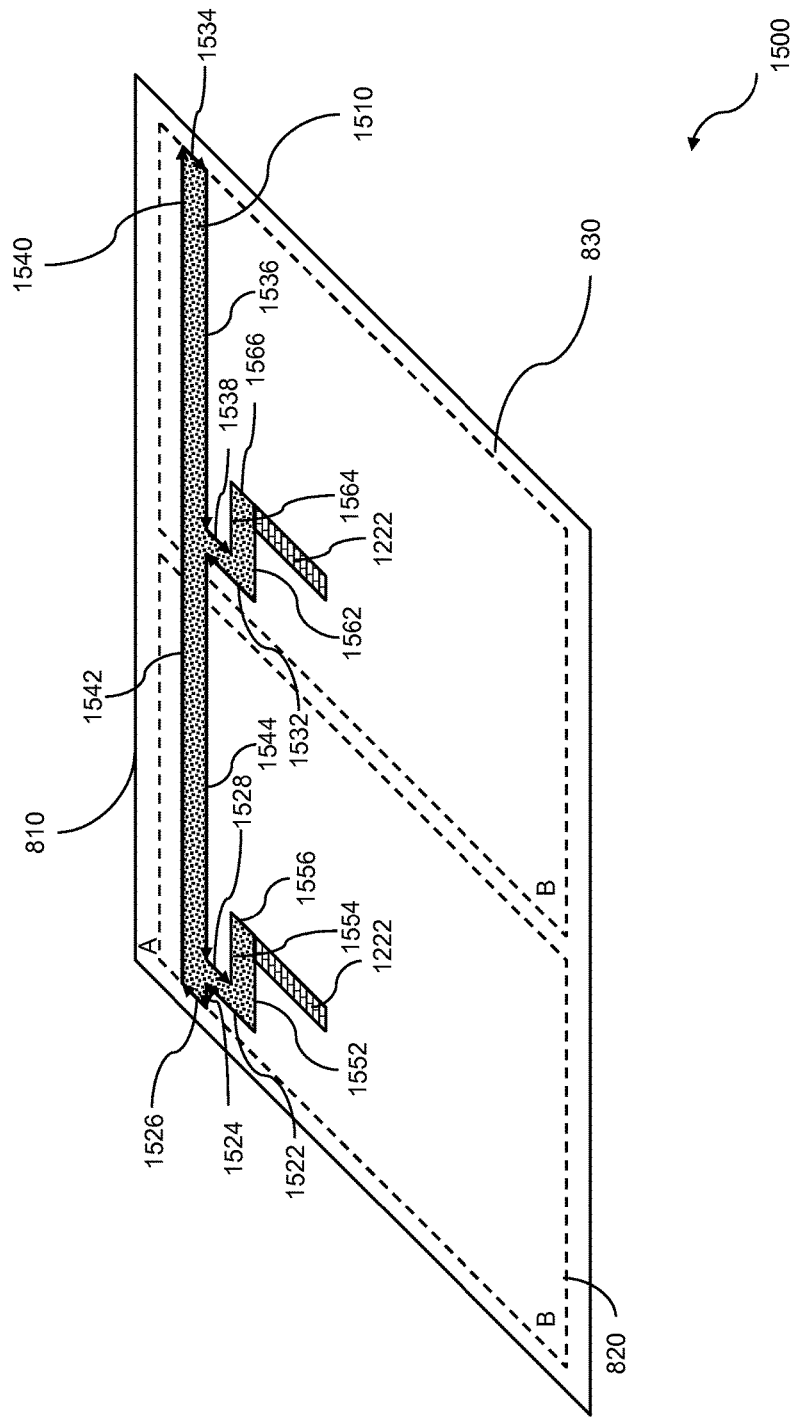
FIG. 15 shows the main model data, context model data, and duplicate model data placed in the parent cell A and used to generate results of the example DRC command in the parent cell A.

FIG. 15 shows the use of main model data, context model data, and duplicate model data in the parent cell A to generate results of the example DRC command in the parent cell A. With the information carried in the three model channels combined, the hierarchical operation can be properly resolved in the parent cell. The drawing 1500 shows a polygon 1510 which is formed by the union of the compressed main model data for both instantiations of child cell B 820 and 830 and the cell-level data of the parent cell A 810. The polygon 1510 is then transformed into edges, and data from the other model channels is used to remove fake edges and duplicate edges.

The drawing 1500 also shows the edges that can be resolved for cell A 810 using the main model data, the context model data, and the duplicate model data along with the model data, in this case polygon 840, contained in cell A 810 itself. Numerous edges can be resolved based on the union of the data received through the main model channel with the model data of cell A 810, These edges include the edges 1522, 1524, 1526, 1528, 1532, 1534, 1536, 1538, 1542, and 1544. While the edges 1526, 1542, and 1534 were original edges of cell A 810, the other edges are created by the interaction between the model data 1116 passed from the two instantiations of cell B 820 and 830 and the model data of cell A 810.

Edges would have been resolved for the edges 1552, 1554, 1562, and 1564 based on the model data passed from the two instantiations of cell B 820 and 830 except for the duplicate model data 1342 and 1344 passed through the duplicate model channel. The edges 1552, 1554, 1562, and 1564 are thus removed from the evaluation of cell A 810 because they were already resolved in instances of cell B 820 and 830.

Also, edges would have been resolved for the edges 1556 and 1566 based on the model data passed from the two instantiations of cell B 820 and 830 except for the context model data 1222 passed through the context model channel from cell B. By receiving the context model data, it can be determined that the edges 1556 and 1566 should not be created because they are a part of a larger edge in cell B.

Figure 16:
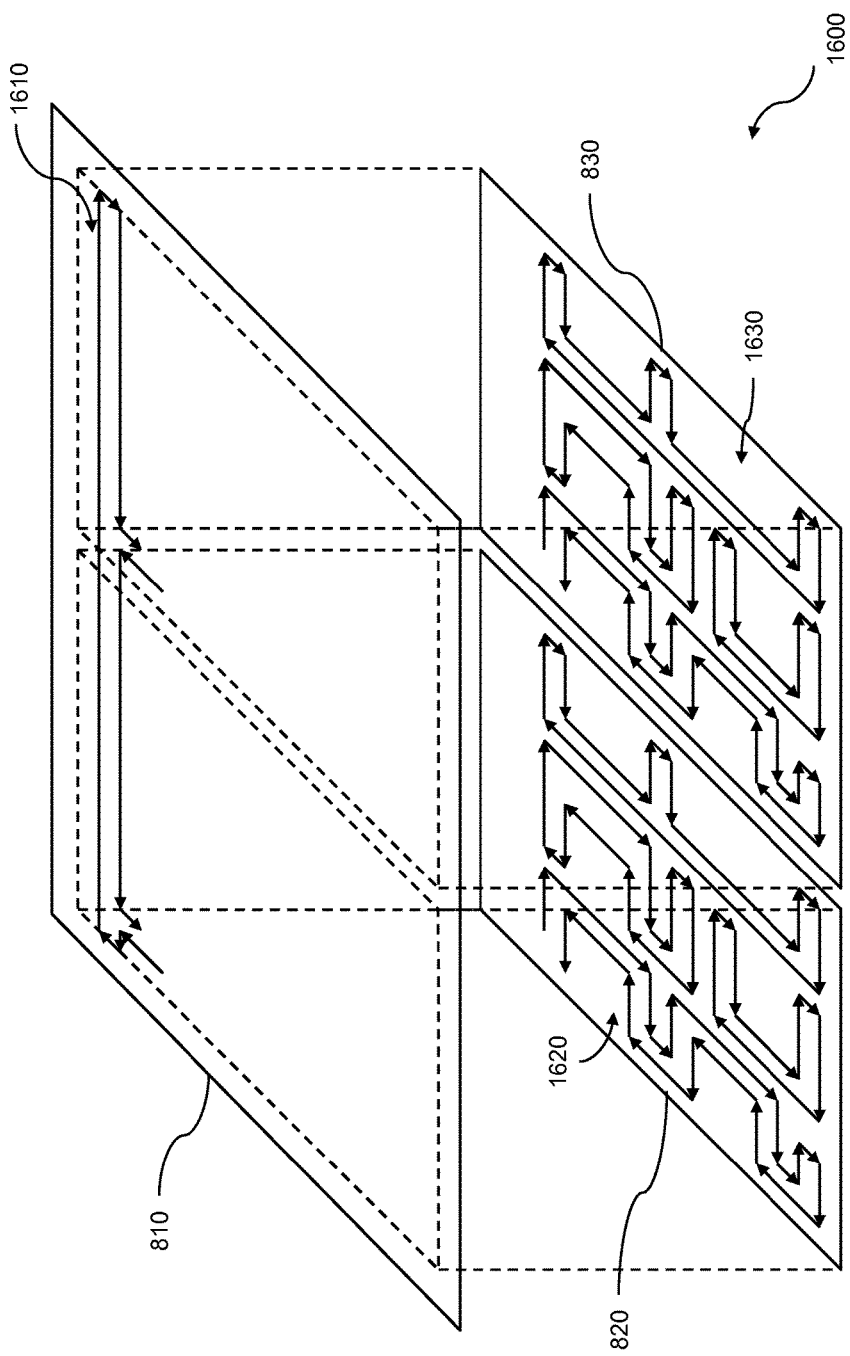
FIG. 16 shows the final results of the example DRC command in the hierarchy.

FIG. 16 shows the final results of the example DRC command in the hierarchy. The drawing 1600 provides a graphical representation of the "length_edge" command on the input design 800 as shown in FIG. 8. The first instantiation 820 of cell B has a set of edges 1620, represented by the arrows within the cell 820, which are resolved regarding their length. The edges 1620 can be resolved by a cell-level geometric operation as they do not interact with shapes outside of the cell. The second instantiation 830 of cell B also has a set of edges 1630, represented by the arrows within the cell 830, which are resolved regarding their length. The edges 1630 can be resolved by a cell-level geometric operation as they do not interact with shapes outside of the cell. Cell A 810 has a set of edges 1610, represented by the arrows within the cell 810, which are resolved regarding their length. The edges 1610 can be resolved by using the cell model data in conjunction with the data from the multiple channels from the instantiations 820 and 830 of cell B.

Figure 17:
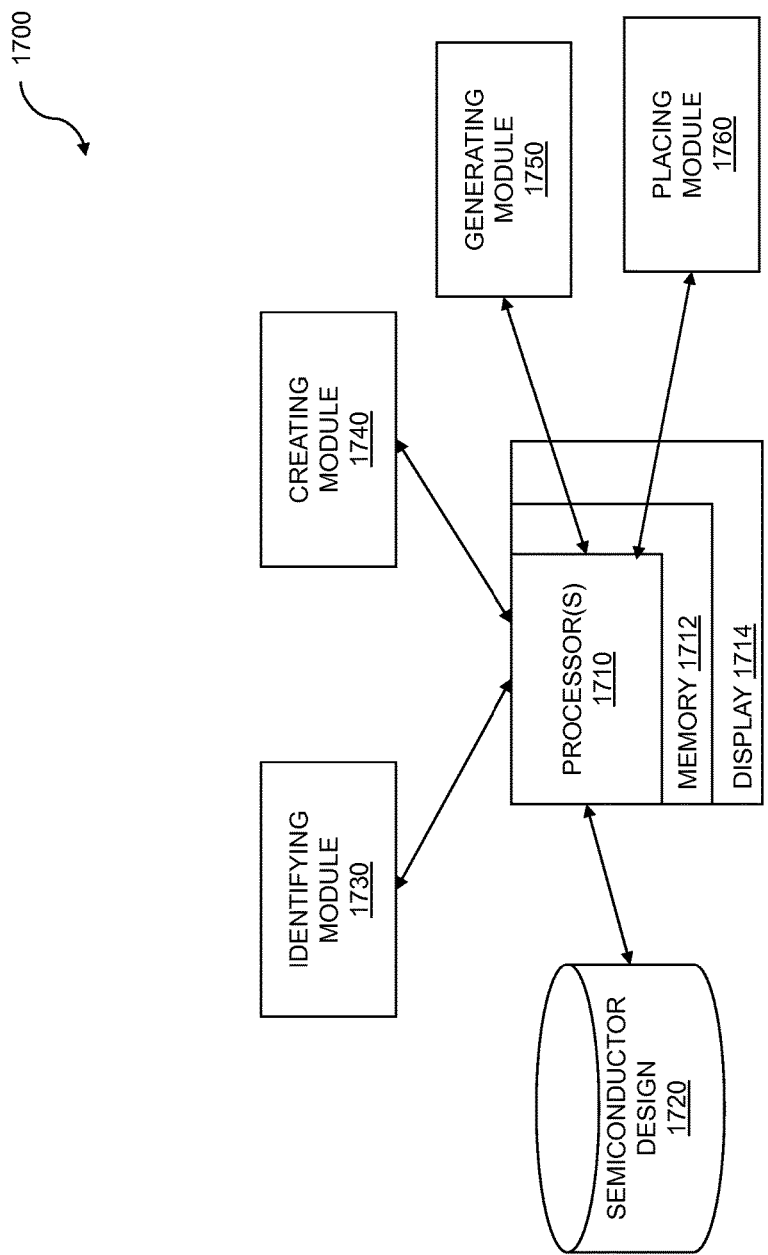
FIG. 17 is a system diagram for virtual cell model usage.

FIG. 17 is a system diagram for virtual cell model usage. The system 1700 is an embodiment of a computer system for design analysis. The system 1700 includes one or more processors 1710 which are coupled to a memory 1712. The memory 1712 can be used to temporarily or permanently store instructions, such as computer code, as well as calculated, temporary, partial, intermediate, and/or permanent computer data. The data can include any appropriate type or types of data including data for one or more semiconductor designs. The semiconductor design data can include cell information; hierarchical level information; layout information; layer information; mask information; optical information; design, configuration, and test data; test instructions; and so on. The data can include and describe various design levels. The data can include other types of data such as system support information, analysis results, and the like. The data can also include VHL data and/or virtual cell model data. A display 1714 can also be present. The display 1714 can be any of a variety of electronic projectors, monitors, displays, and screens, including but not limited to, a computer display or screen, a laptop computer screen, a tablet screen, a smartphone display, a personal digital assistant (PDA) display, a handheld display, a remote display, a digital projector, or a digital television.

The system 1700 also includes a semiconductor design 1720. The semiconductor design can include a plurality of design levels. The semiconductor design 1720 can be stored in any appropriate storage device and medium including a hard disk drive (HDD), a solid-state drive (SSD), an optical disk drive (ODD), or another computer-readable storage medium. The semiconductor design can include descriptions of levels, hierarchies of levels, virtual hierarchical levels, descriptions of rectangles and polygons, and so on. The system 1700 includes an identifying module 1730. The identifying module can be used to identify a cell and multiple instances of the cell within a plurality of cells in a semiconductor design 1720 that includes the plurality of cells and a plurality of hierarchical design levels. The identified cell can be any of a variety of cells including analog cells, logic cells, storage cells, processing cells, interconnection cells, and so on. The cell can be a parent cell, a child cell contained within a parent cell, a sibling cell to a cell contained within the parent cell, and so on. A creating module 1740 is included in the system 1700. The creating module can create an empty cell model corresponding with the cell which was identified. The empty cell model can be created for any of a variety of purposes including design modeling, simulation, and verification, for example. The empty cell model can be created to contain cell information for any hierarchical level of the semiconductor design. A generating module 1750 is also included in the system 1700. The generating module can generate model data, based on data within the cell and virtual hierarchical layer (VHL) shapes. The cell data and VHL shapes can include polygons and partial polygons. The polygons and partial polygons can include rectangles, rhombi, complex polygons, and so on. Any shape appropriate to the semiconductor design can be included. The system 1700 also includes a placing module 1760. The placing module can be used for placing the model data into the empty cell model to create a virtual cell model. The virtual cell model can be based on data within the cell and VHL shapes. The model data can include rectangles, rhombi, and other polygons. The model data can include partial polygons. In at least one embodiment, the functions of the identifying module 1730, the creating module 1740, the generating module 1750, and/or the placing module 1760 are accomplished or augmented by the one or more processors 1710.

The system 1700 can include a computer program product for design analysis. The computer program product can be embodied in a non-transitory computer readable medium and can comprise code for identifying a cell and multiple instances of the cell within a plurality of cells in a semiconductor design that includes the plurality of cells and a plurality of hierarchical design levels; code for creating an empty cell model corresponding with the cell which was identified; and code for generating model data, based on data within the cell and virtual hierarchical layer (VHL) shapes, and placing the model data into the empty cell model to create a virtual cell model.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for a layout design analysis of an integrated circuit, the method comprising:
   identifying a cell with multiple instances within a plurality of cells in a semiconductor design, wherein the plurality of cells are contained in a plurality of hierarchical design levels;
   creating an empty cell model corresponding with the cell which was identified;
   generating model data, based on a design rules checking (DRC) algorithm using data within the cell, and placing the model data into the empty cell model to create a virtual cell model, wherein the model data includes multiple model channels to carry model data from the cell to a parent cell, wherein one of the multiple model channels includes a duplicate model channel;
   identifying one or more edges to be removed in the virtual cell model;
   sending the one or more edges to the parent cell via the duplicate model channel, and verifying, using one or more processors, the semiconductor design layout based on the virtual cell model.

2. The method of claim 1 wherein the generating the model data is based on a cell-level geometric operation.

3. The method of claim 2 wherein the cell-level geometric operation cannot be resolved within the cell.

4. The method of claim 3 wherein the cell-level geometric operation cannot be resolved due to polygons interacting with the cell.

5. The method of claim 4 wherein the polygons are from a parent cell or a sibling cell.

6. The method of claim 3 wherein the cell-level geometric operation cannot be resolved due to interactions with other shapes in the semiconductor design.

7. The method of claim 6 wherein the interactions are between the other shapes and shapes within the cell.

8. The method of claim 6 wherein the generating the model data comprises executing an area command to process each of the other shapes that are overlapping the data within the cell.

9. The method of claim 8 wherein the generating the model data comprises executing an area command to process each of the other shapes that are abutting the data within the cell.

10. The method of claim 9 wherein the generating the model data comprises executing a length edge command to compute a length of an edge residing within a level of the plurality of hierarchical design levels.

11. The method of claim 1 wherein one of the multiple model channels includes a selector model channel comprising:
    identifying an overlapping polygon from the polygons;
    selecting a portion of the overlapping polygon, wherein the portion is smaller than the entire overlapping polygon; and sending the portion to the parent cell via the selector model channel.

12. The method of claim 1 further comprising passing the model data to a higher level of hierarchy within the plurality of hierarchical design levels.

13. The method of claim 12 wherein the passing includes polygons to provide context for the model data.

14. The method of claim 12 wherein the passing further includes removal of duplicate shapes.

15. The method of claim 14 wherein the removal occurs in a parent cell.

16. The method of claim 1 wherein the virtual cell model is generated using geometric processing with cell-level algorithms.

17. The method of claim 1 wherein the virtual cell model provides a compressed representation of the cell.

18. The method of claim 1 further comprising using the virtual cell model in place of the cell in design operations.

19. A computer system for a layout design analysis of a semiconductor integrated circuit and comprising:
   a memory which stores instructions;
   one or more processors coupled to the memory wherein the one or more processors are configured to:
   identify a cell with multiple instances within a plurality of cells in a semiconductor design, wherein the plurality of cells are contained in a plurality of hierarchical design levels;
   create an empty cell model corresponding with the cell which was identified;
   generate model data, based on a design rules checking (DRC) algorithm using data within the cell, and placing the model data into the empty cell model to create a virtual cell model wherein the model data includes multiple model channels to carry model data from the cell to a parent cell, wherein one of the multiple model channels includes a duplicate model channel;
   identify one or more edges to be removed in the virtual cell model;
   send the one or more edges to the parent cell via the duplicate model channel; and
   verify the semiconductor design layout based on the virtual cell model.

20. The computer system of claim 19 wherein the virtual cell model is generated using geometric processing with cell-level algorithms.

21. The computer system of claim 19 wherein the virtual cell model provides a compressed representation of the cell.

22. The computer system of claim 19 further comprising using the virtual cell model in place of the cell in design operations.

23. A computer program product embodied in a non-transitory computer readable medium, which when executed by a processor, causes the processor to perform a layout design analysis of a semiconductor integrated circuit, the computer program product comprising instructions that when executed cause the processor to:
   identify a cell with multiple instances within a plurality of cells in semiconductor design, wherein the plurality of cells are contained in a plurality of hierarchical design levels;
   create an empty cell model corresponding with the cell which was identified; and
   generate model data, based on a design rules checking (DRC) algorithm using data within the cell, and placing the model data into the empty cell model to create a virtual cell model wherein the model data includes multiple model channels to carry model data from the cell to a parent cell, wherein one of the multiple model channels includes a duplicate model channel;
   identify one or more edges to be removed in the virtual cell model;
   send the one or more edges to the parent cell via the duplicate model channel; and
   verify the semiconductor design layout based on the virtual cell model.

24. The computer program product of claim 23 wherein the virtual cell model is generated using geometric processing with cell-level algorithms.

25. The computer program product of claim 23 wherein the virtual cell model provides a compressed representation of the cell.

26. The computer program product of claim 23 that further causes the processor to use the virtual cell model in place of the cell in design operations.

* * * * *